US006900774B2

(12) United States Patent
Kawakami et al.

(10) Patent No.: US 6,900,774 B2
(45) Date of Patent: May 31, 2005

(54) SHIELDING DEVICE FOR ANTENNA BOARD, AND LIQUID EJECTION APPARATUS INCORPORATING THE SAME

(75) Inventors: Kunio Kawakami, Nagano (JP); Osamu Koshiishi, Nagano (JP); Kazuo Tanaka, Nagano (JP); Osamu Hanamura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 72 days.

(21) Appl. No.: 10/652,240

(22) Filed: Sep. 2, 2003

(65) Prior Publication Data

US 2004/0207564 A1 Oct. 21, 2004

(30) Foreign Application Priority Data

Aug. 30, 2002 (JP) .................................... P2002-252599
Aug. 29, 2003 (JP) .................................... P2003-306009

(51) Int. Cl.[7] .......................... H01Q 1/52; G01D 11/00
(52) U.S. Cl. ....................................... 343/841; 347/100
(58) Field of Search ................................ 343/841, 702, 343/700 MS; 347/100, 108, 3, 6

(56) References Cited

U.S. PATENT DOCUMENTS 6,113,207 A * 9/2000 Nakano et al. ................ 347/3
6,758,544 B2 * 7/2004 Fukano .......................... 347/9
6,764,152 B2 * 7/2004 Umeda et al. ................. 347/9
2004/0060162 A1 * 4/2004 Moren ......................... 29/601

FOREIGN PATENT DOCUMENTS

JP 2002-127391 A 8/2002

* cited by examiner

*Primary Examiner*—Don Wong
*Assistant Examiner*—Minh Dieu A
(74) *Attorney, Agent, or Firm*—Sughrue Mion, PLLC

(57) ABSTRACT

A first plate member constitutes a part of a main frame of a liquid ejection apparatus. A second plate member is extended from the first plate member such that a first part thereof opposes to a traveling path of a carriage which carries a plurality of liquid containers each provided with an IC chip and a receiving antenna. A transmission antenna is provided on an antenna board. The antenna board is mounted on the first part of the second plate member. The second plate member is formed with a first region which allows the transmission antenna to establish radio communication with the receiving antenna, and a second region which shields radio waves.

10 Claims, 29 Drawing Sheets

SHIELDING DEVICE FOR ANTENNA BOARD, AND LIQUID EJECTION APPARATUS INCORPORATING THE SAME

BACKGROUND OF THE INVENTION

The present invention relates to a device for shielding radio waves from an antenna board which transmits radio signals to IC chips provided on ink cartridges to be used in a recording apparatus such as an ink jet recording apparatus, and to the recording apparatus and a liquid ejection apparatus provided with the shielding device.

The liquid ejection apparatus herein described means not only the recording apparatus such as a printer, a copying machine, a facsimile employing an ink jet recording head and adapted to eject ink from the recording head to conduct recording on a recording medium, but also such an apparatus as ejecting a liquid suitable for its purpose, instead of the ink, from a liquid ejection head corresponding to the above described recording head to a target medium corresponding to the recording medium, thereby to deposit the above described liquid on the target medium.

As the liquid ejection head, there are mentioned besides the above described recording head, a coloring material ejection head which is employed in manufacture of color filters for a liquid crystal display or the like, an electrode material (electrically conductive paste) ejection head which is employed in fabrication of electrodes for an organic EL display, a face light emitting display (FED) or the like, a biological organic substance ejection head which is employed in fabrication of biological chips, a sample ejection head as a precision pipette, and so on.

In a non-contact type printer disclosed in Japanese Patent Publication No. 2002-127391A, cartridges containing a plurality of coloring media independently or integrally and having cartridge antennas corresponding to the coloring media incorporated therein are mounted on a carriage which is supported by a printer body so as to reciprocally move in a widthwise direction of recording, thereby to conduct printing by using the aforesaid coloring media. The carriage is provided with a body side antenna which is opposed to the cartridge antennas provided on respective cartridges, and the printer body is provided with a shielding plate made of electromagnetic shielding material which is inserted between a group of the cartridge antennas and the body side antenna when the carriage has arrived at a predetermined position. This shielding plate is provided with a window for sequentially permitting transmission and reception of signals between the body side antenna and the cartridge antennas, according to the movement of the carriage. The body side antenna has such a width that it can be opposed to all the antennas on a plurality of the cartridges mounted on the carriage.

The body side antenna is opposed to the respective cartridge antennas along with the movements of the carriage, and can make an access to a desired cartridge at a desired timing. When the carriage has arrived at the predetermined position, the aforesaid shielding plate will mask the cartridge antennas positioned at other places except the window, with respect to the body side antenna. On this occasion, transmission between the cartridge antenna which is not masked and the body side antenna is possible through the window.

However, in the above described structure, the body side antenna must have such a width that it can be opposed to all the cartridge antennas, and this will be a factor for hindering downsizing and cost reduction of components. Moreover, there is another problem that because the window of the shielding plate must be moved to an appropriate place to be masked according to the movements of the carriage, the structure will be complicated, and easily affected by manufacturing and assembling errors.

Further, in a type in which the ink cartridges are provided at the body side of the ink jet recording apparatus, it is also necessary to provide radio wave shielding function for the purpose of accurately exchanging information, for the reason that communication of the data must be conducted between positions of the IC chips of the ink cartridges and positions of connecting terminals in a communicating section.

SUMMARY OF THE INVENTION

It is therefore an object of the invention to provide a shielding device for an antenna board which will be hardly affected by a large-sized and complicated structure, an increase of cost for components, and manufacturing and assembling errors.

It is also an object of the invention to provide, in a type provided with ink cartridges on a body side of an ink jet recording apparatus, radio wave shielding function which is simple in structure and of low cost.

In order to attain the above described objects, according to the invention, there is provided a shielding device, comprising:

a first plate member, which constitutes a part of a main frame of a liquid ejection apparatus;

a second plate member, extended from the first plate member such that a first part thereof opposes to a traveling path of a carriage which carries a plurality of liquid containers each provided with an IC chip and a receiving antenna; and an antenna board, on which a transmission antenna is provided, the antenna board being mounted on the first part of the second plate member, wherein the second plate member is formed with a first region which allows the transmission antenna to establish radio communication with the receiving antenna, and a second region which shields radio waves.

With this configuration, the radio waves generated from the transmission antenna of the antenna board can be prevented from being transmitted in a direction unnecessary to be received by the receiving antennas, by the second plate member having the radio wave shielding function, and therefore, directivity of the radio waves to the receiving antennas can be enhanced. Moreover, the radio wave shielding plate which has been heretofore provided in a stack on a lower face of the antenna board can be separated from the antenna board, and so, cost for the antenna board can be decreased. Further, the second plate member can be formed by working a part of the main frame (the first plate member) of the liquid ejection apparatus. Therefore, the second plate member can be formed at a low cost and easily, and at the same time, can be made of rigid material constituting the main frame, thus enabling high holding ability for the board to be realized.

Preferably, the second plate member is comprised of iron. The first region is provided as a cutout portion piercing through the second plate member.

In this case, it is possible to form the region necessary for transmission of the information by radio waves between the antenna board and the receiving antennas with extreme ease, and to cope with mass production.

Here, it is preferble that the transmission antenna comprises a load fluctuation detector, operable to detect load fluctuation generated when the receiving antenna receives a radio signal transmitted from the transmission antenna, in order to read information stored in the IC chip. The first region is formed so as to oppose to the load fluctuation detector.

In this case, the information stored in the IC chip can be grasped by the antenna board, even though the IC chip is not provided with a transmittor.

Preferably, the antenna board is provided as a flexible board member. In this case, the antenna board can be prevented from being deformed due to a drop or shock, and can be easily fixed and positioned to a board mounting plate without necessity of providing a connector on the antenna board.

According to the invention, there is also provided a liquid ejection apparatus, comprising the above shielding member and a liquid ejection head operable to eject liquid supplied from the liquid containers.

In this case, directivity of the radio waves from the transmission antenna of the antenna board to the receiving antennas can be enhanced, and it is possible to provide the liquid ejection apparatus which can reliably grasp the information on the liquid containers, and has least troubles.

According to the invention, there is also provided a liquid ejection apparatus, comprising:

a liquid ejection head, operable to eject liquid therefrom;

a first communicator;

a carriage, which carries the liquid ejection head and the first communicator along a traveling path thereof;

at least one liquid supplier, which comprises:

a pack member which contains therein liquid to be supplied to the liquid ejection head;

a casing member which houses the pack member therein; and a second communicator, operable to communicate information regarding liquid contained in the pack member with the first communicator via radio communication; and a holder, in which the liquid supplier is mounted, the holder formed with at least one window which opposes to the second communicator in a case where the liquid supplier is mounted in the holder, and opposes to the traveling path of the carriage so that the first communicator and the second communicator establish the radio communication through the window in a case where the first communicator opposes to the window, wherein a first region around the window is so configured as to shield radio waves.

With this configuration, the first communicator and the second communicator come close to each other, so that communication of the information between them can be reliably performed with high precision. For this reason, it is possible to provide the liquid ejection apparatus which can transmit the information from the liquid supplier to a main body of the liquid ejection apparatus in a non-contact manner, precisely and without incurring an increase of the cost. In addition, because the radio waves communicated between the first communicator and the second communicator can be prevented from being sent in a direction not required for reception, directivity of the radio waves to the receiving side can be enhanced.

Preferably, the first region is comprised of iron. In this case, the above described shielding function can be reliably achieved.

Preferably, a plurality of liquid suppliers and a plurality of windows are arranged in the holder along the traveling path of the carriage, such that each of the windows is associated with one of the liquid suppliers.

In this case, the radio waves from the second communicator of the liquid supplier adjacent to the liquid supplier of interest is prevented from being received by mistake by the first communicator opposed to the former liquid supplier, and so, accurate transmission of the information can be realized.

Preferably, the holder is provided with a shutter member operable to close the window in a case where the liquid supplier is not mounted in the holder. The shutter member is provided with a third communicator operable to communicate information that no liquid supplier is mounted in the holder with the first communicator, in a case where the shutter closes the window.

With this configuration, the first communicator which has moved in vicinity of the window of the holder in which the liquid supplier is not arranged can receive the information "the liquid supplier is absent" from the third communicator. Consequently, the first communicator can be prevented beforehand from receiving wrong information.

Preferably, a first positioning member is provided on a lower face of the casing member. A second positioning member is provided on a mount face of the holder on which the lower face of the casing member is placed, such that the first positioning member is engaged with the second positioning member in a case where the liquid supplier is correctly mounted in the holder. The holder is provided with a retainer which presses an upper face of the casing member toward the mount face of the holder, so that the liquids supplier is retained in the holder.

With this configuration, the liquid supplier can be positioned more reliably inside the holder.

DETAILED DESCRIPTION OF THE INVENTION

Preferred embodiments of the present invention will be described below with reference to the accompanying drawings.

Figure 1:
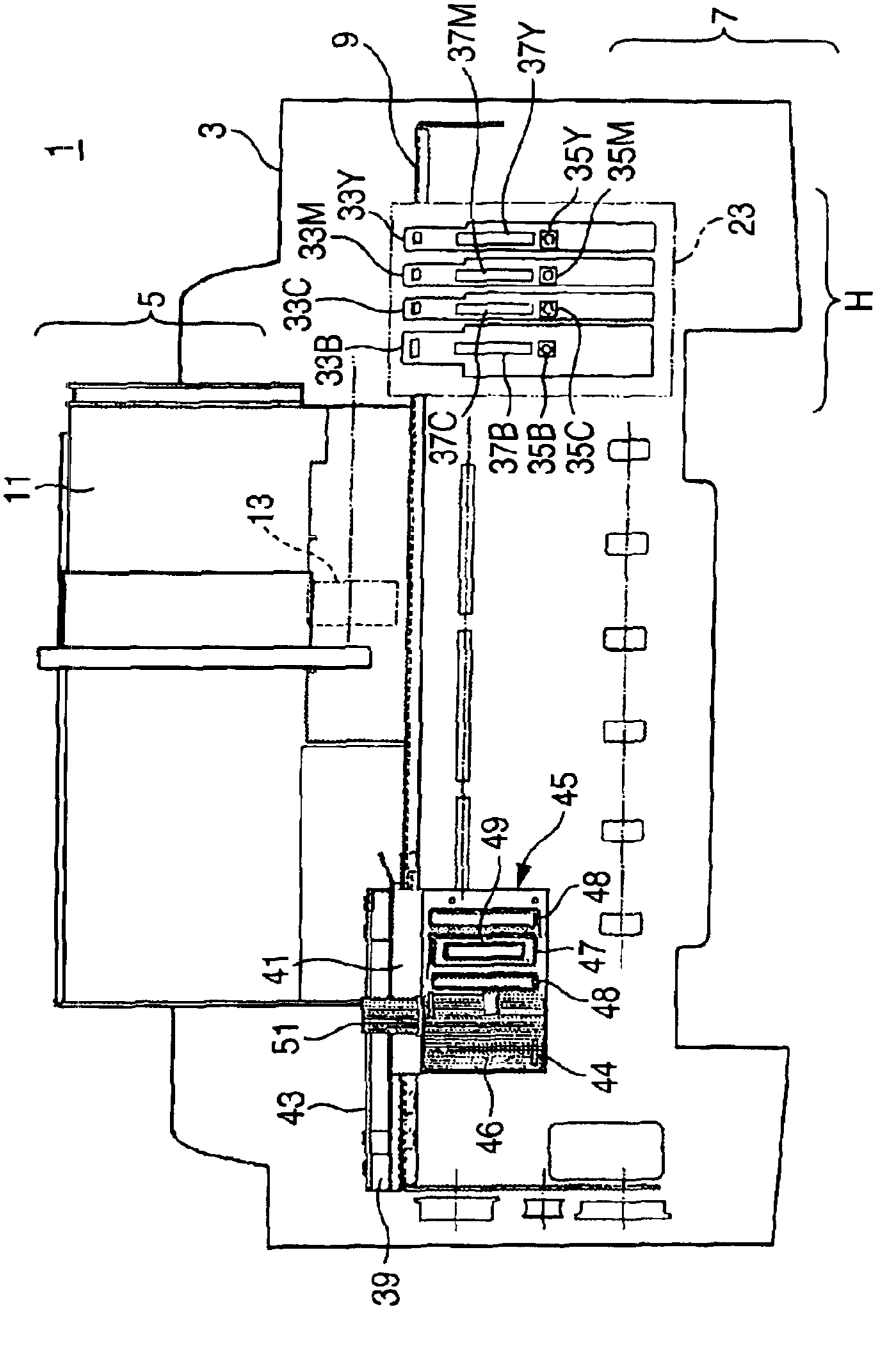
FIG. 1 is a plan view schematically showing an ink jet recording apparatus according to a first embodiment of the invention.

An ink jet recording apparatus 1 which is one kind of recording apparatuses and liquid ejection apparatuses has a general structure, as shown in FIG. 1, including a paper feeding part 5 in an upper part behind a printer body 3, and a paper discharging part 7 in front of the printer body 3.

Figure 2:
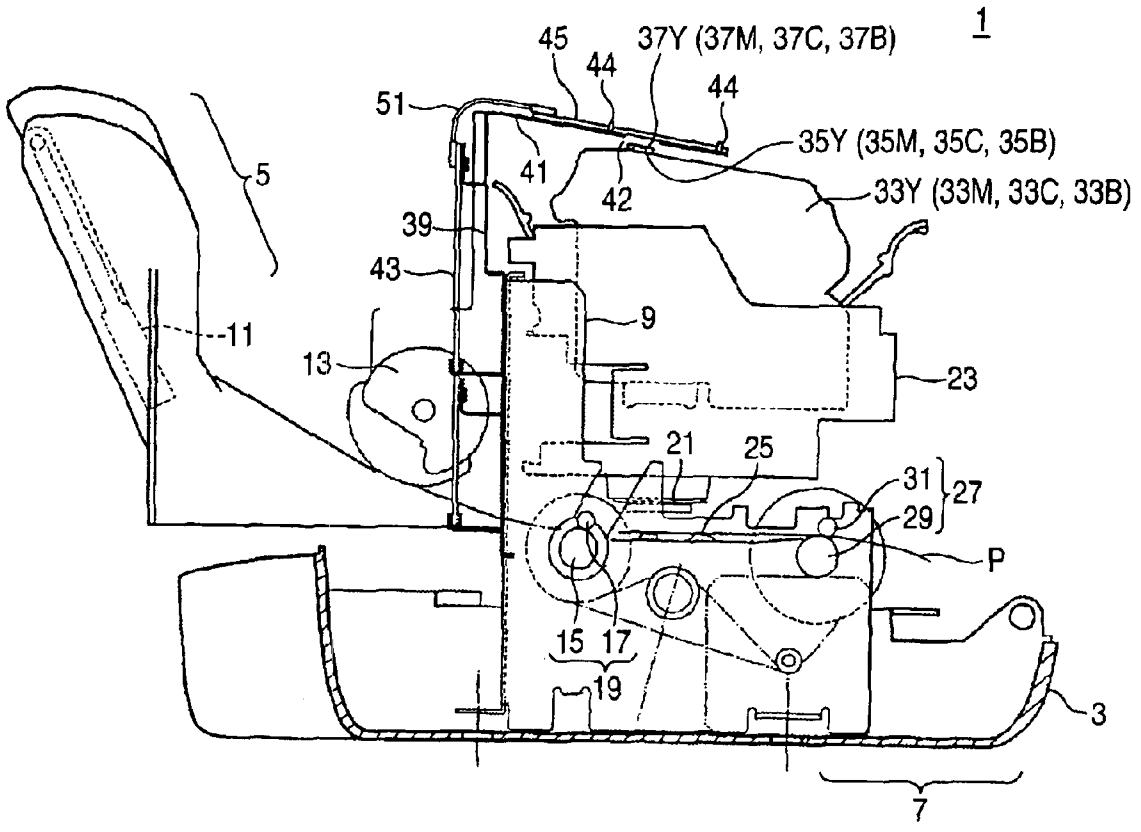
FIG. 2 is a side view schematically showing the ink jet recording apparatus of FIG. 1.

As shown in FIG. 2, a plurality of sheets of recording paper can be loaded on a paper feeding tray 11 formed in the paper feeding part 5, and an outer peripheral face of a paper feeding roller 13 which is provided immediately downward of the paper feeding tray 11 comes into friction contact with the uppermost sheet of the recording paper, thereby to feed only one sheet of the recording paper in cooperation with a separating pad opposed thereto.

The recording paper fed from the paper feeding tray 11 arrives at a set of paper feeding rollers 19 including a paper feeding driving roller 15 in a lower part and a paper feeding driven roller 17 in an upper part which are provided with respect to a main frame 9 of the printer body 3, and then supplied to a recording head 21 positioned downward of the set of the paper feeding rollers 19 while receiving precise paper feeding actions in an actual recording process from a driving system.

The recording head 21 is held by a carriage 23, and the carriage 23 is adapted to make reciprocating motions in a direction (a primary scanning direction) perpendicular to a paper feeding direction. A platen 25 is provided in a position opposed to the recording head 21. The platen 25 serves to support the recording paper from below, when recording is conducted on the recording paper by the recording head 21.

A distance between the recording head 21 and the recording paper on the platen 25, in short, a paper gap can be appropriately adjusted according to a thickness of the recording paper, by moving up and down the carriage 23 supporting the recording head 21. In a state where the paper gap has been appropriately adjusted, the recording paper will smoothly move on the platen 25 to perform high quality recording, and the recording paper which has been recorded at the recording head 21 is sequentially discharged by a set of paper discharging rollers 27 which are provided in the paper discharging part 7. The set of the paper discharging rollers 27 include a driving roller 29 in a lower part and a toothed roller 31 in an upper part, and has such a structure that the recording paper P is pulled out by rotary motion of the driving roller 29 to be discharged.

Figure 3:
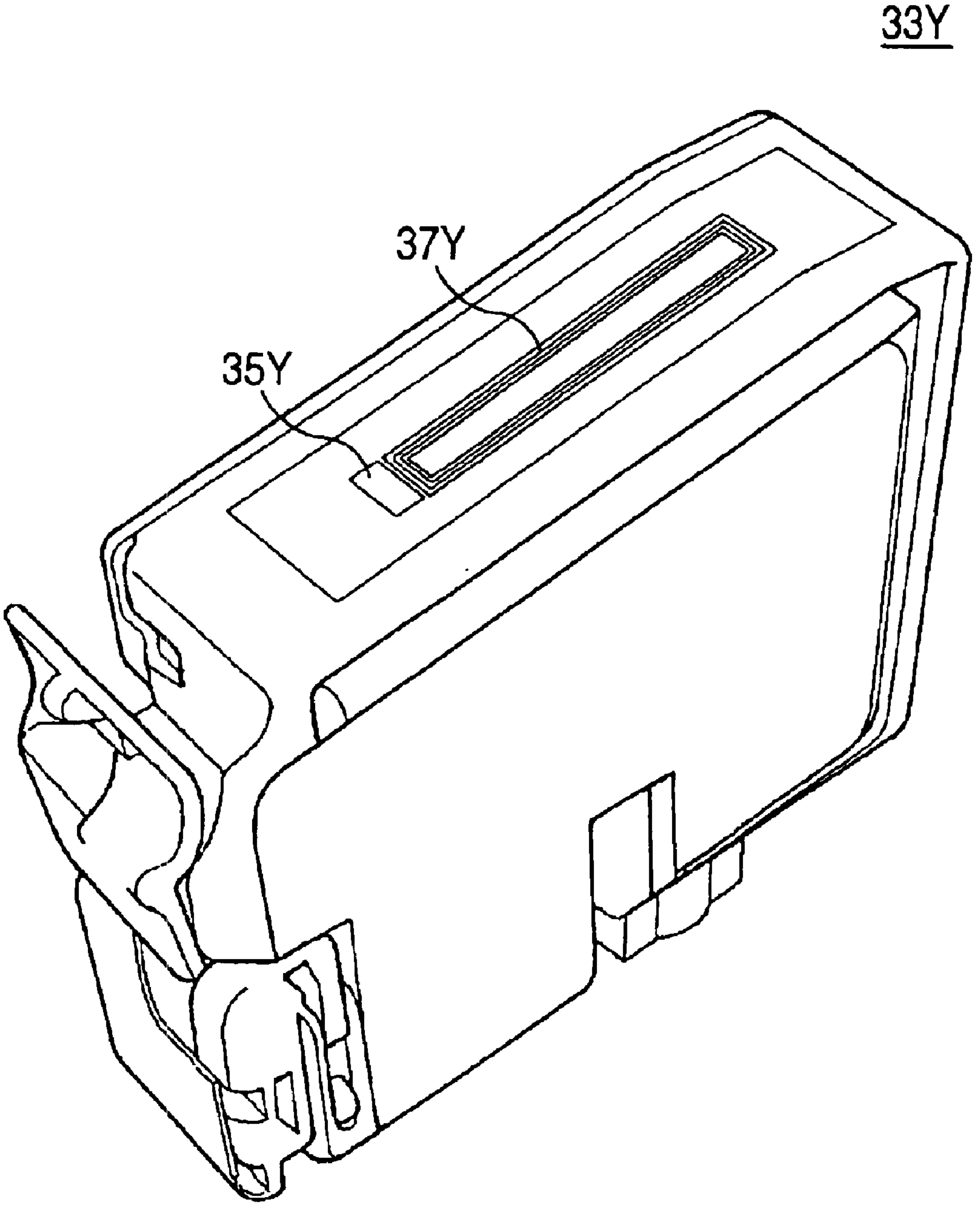
FIG. 3 is a perspective view of an ink cartridge to be mounted on the ink jet recording apparatus of FIG. 1.

Ink cartridges 33Y, 33M, 33C, 33B for respective colors, namely, yellow, magenta, cyan, and black (FIG. 3 shows the ink cartridge 33Y as a representative) having the same structure are mounted on the carriage 23, and IC chips 35Y, 35M, 35C, and 35B carrying information on the respective ink cartridges are attached to upper faces of the respective ink cartridges. Storage devices for storing fixed information such as colors of the ink, variable information such as remaining amounts of the ink are incorporated in these IC chips 35Y, 35M, 35C, 35B. The remaining amounts of the ink can be obtained, for example, by counting recording (printing) dot signals, integrating the counted numbers to memorize them, and calculating from these integrated values.

In addition, receiving antennas 37Y, 37M, 37C and 37B are respectively connected to the IC chips 35Y, 35M, 35C, 35B, so as to receive radio signals transmitted from a below described antenna board by scanning motion of the carriage 23, when the receiving antennas have arrived below the antenna board.

As shown in FIG. 1, on the right side of the printer body 3, there is formed a home position H in which the carriage 23 stays on standby while the carriage 23 is not in the recording action. While the carriage 23 is positioned in the home position H (in a state as shown in FIG. 1), nozzles of the recording head 21 are sealed by cap members which are not shown, and cleaning action is effected by sucking motion of a pump member which is not shown, thereby preventing the nozzles from being clogged with the ink.

At an opposite side to the home position (the left side in FIG. 1), a main mounting plate 39 is fixed to a back face of the main frame 9. A board mounting plate 41 is integrally extended from an upper end of the main mounting plate 39, and extended like an eave, above a scanning path of the carriage 23, that is, moving paths of the receiving antennas 37Y, 37M, 37C, 37B. The board mounting plate 41 is formed of sheet-shaped iron having radio wave shielding function iherently as well as the main mounting plate 39. Moreover, the board mounting plate 41 is formed with cut-outs 42 at predetermined positions where the radio wave shielding function is not necessary. Further, the board mounting plate 41 is provided, on its upper face, with two positioning projections 44 for positioning an antenna board 45 which will be described below.

Positions and shapes of the cut-outs 42 correspond to areas in which transmission of the information between the below described antenna board and the receiving antennas 37Y, 37M, 37C, 37B provided in the ink cartridges are conducted. This will be described hereunder in detail.

Figure 4:
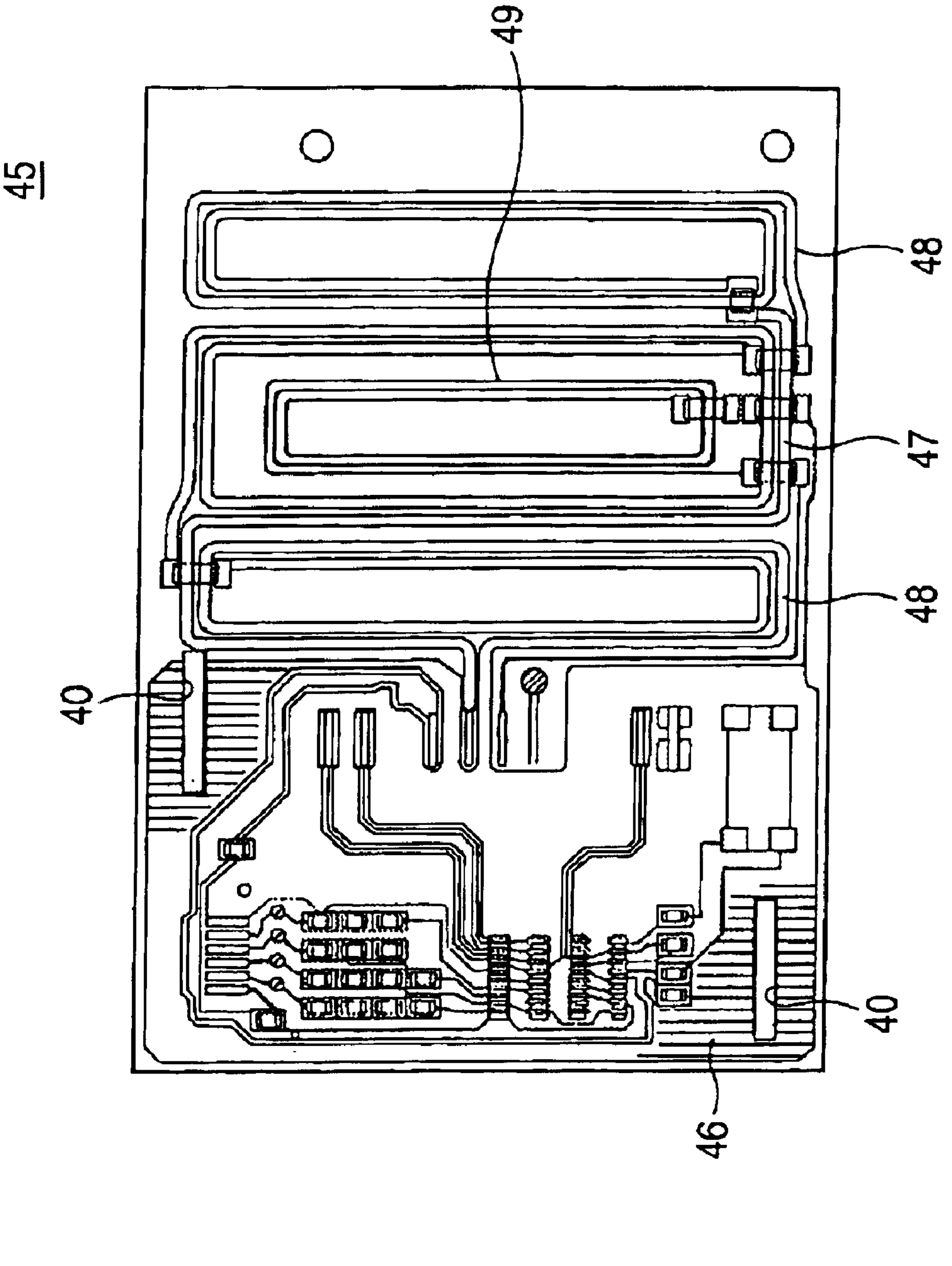
FIG. 4 is a plan view of an antenna board to be mounted on the ink jet recording apparatus of FIG. 1.
Figure 5:
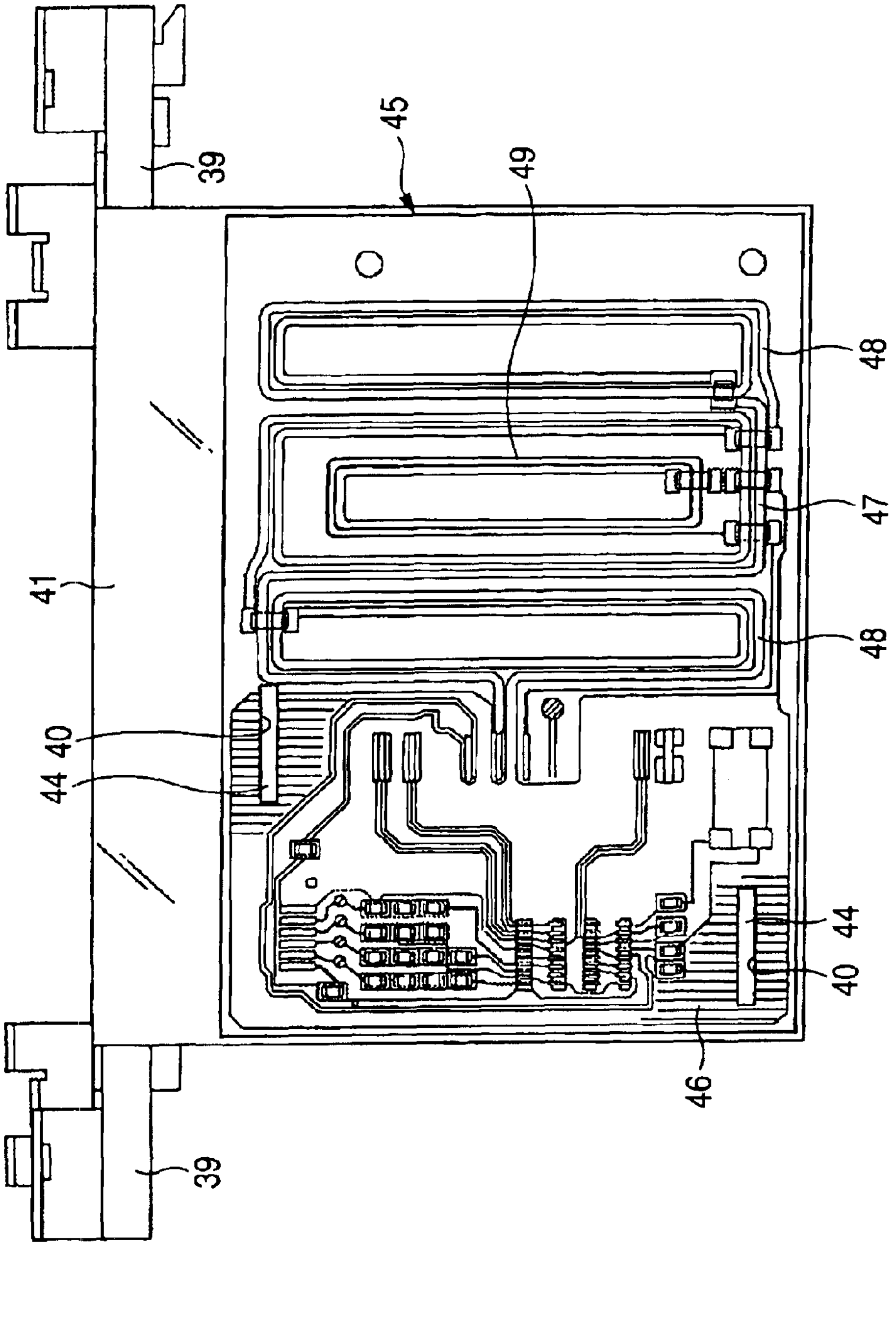
FIG. 5 is a plan view of the antenna board mounted to a board mounting plate in the ink jet recording apparatus of FIG. 1.

Then, the antenna board 45 mounted on the upper face of the board mounting plate 41 will be described. As shown in FIG. 4, the antenna board 45 includes a circuit part 46 and a transmission antenna 47. In addition, cancelers 48 are provided at both sides of the transmission antenna 47, and a load variation detector 49 is provided inside the transmission antenna 47.

Radio signals transmitted from the transmission antenna 47 are read by the receiving antennas 37Y, 37M, 37C, 37B, and load variations occurring when the receiving antennas 37Y, 37M, 37C, 37B receive the radio signals from the transmission antenna 47 are read by the above mentioned load variation detector 49, whereby the information stored in the IC chips 35Y, 35M, 35C, 35B on the respective ink cartridges can be grasped. Then, the information which has been read is transmitted to a main board 43 by way of a cable 51.

The cancelers 48 generates radio signals having a function of canceling the radio signals from the transmission antenna 47 when the radio signals are transmitted to the target receiving antennas, to such an extent that the radio signals may hardly reach the adjacent receiving antennas.

The antenna board 45 is formed with positioning holes 40 so that the antenna board 45 can be positioned with respect to the board mounting plate 41, by fitting the positioning holes 40 over the positioning projections 44 of the board mounting plate 41.

Figure 7:
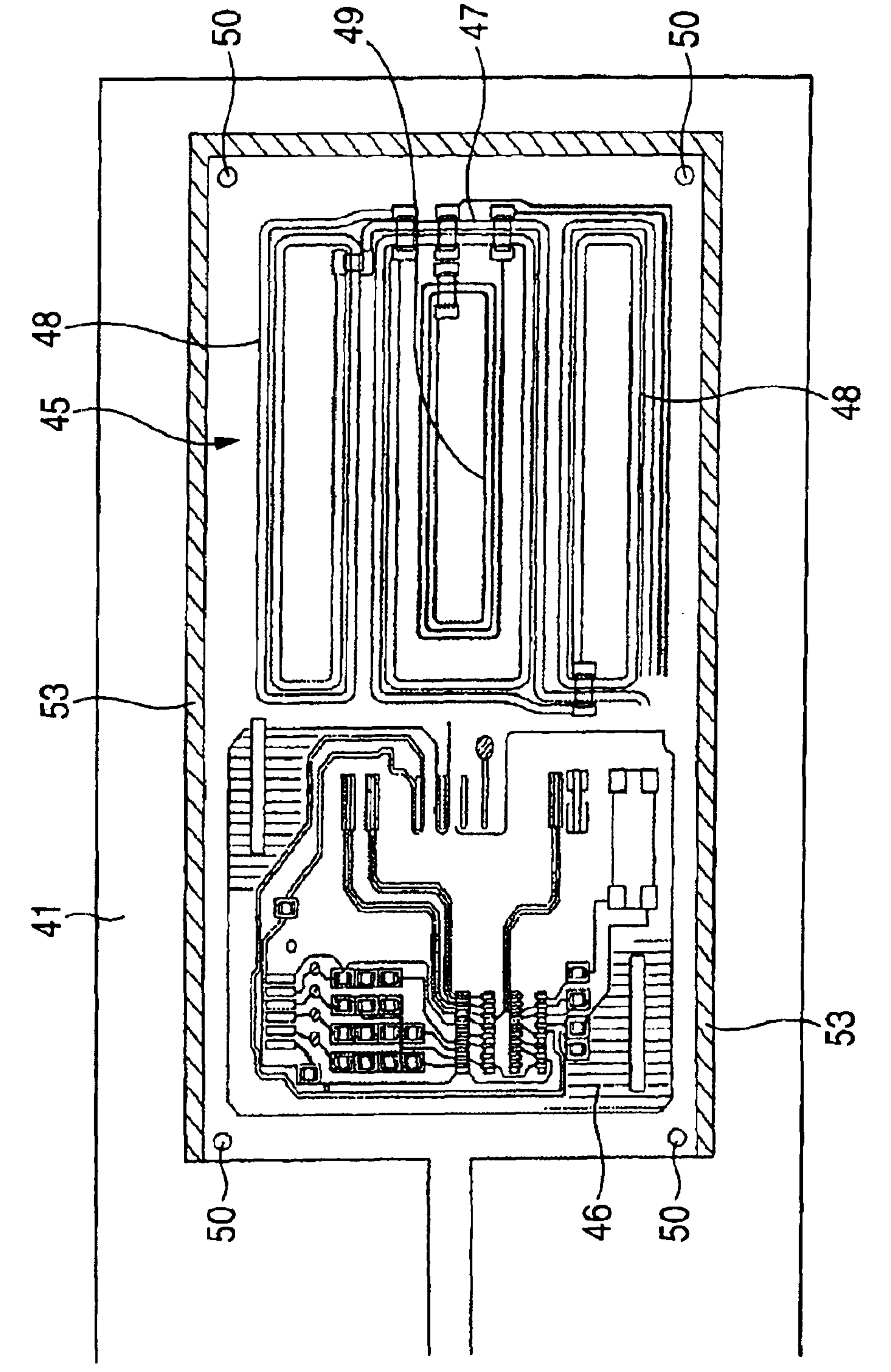
FIG. 7 is a plan view showing a modified example of the antenna board.

Although it is premised that the antenna board 45 described above has rigidity in itself, the antenna board 45 in its entirety may be made of flexible material, specifically in a form of an FPC (a flexible printed circuit board). In this case, the antenna board 45 can be fixed and positioned with respect to the board mounting plate 41, by engaging holes (not shown) which are formed in the antenna board 45 with hooks 50 of the board mounting plate 41, as shown in FIG. 7. In order to fix the antenna board 45 more rigidly to the board mounting plate 41, both the members may be bonded with double faced adhesive material 53 as shown in FIG. 7, in addition to fixation by the hooks 50, or alternatively, securing members such as screws may be employed, although not shown in the drawings.

Figure 6:
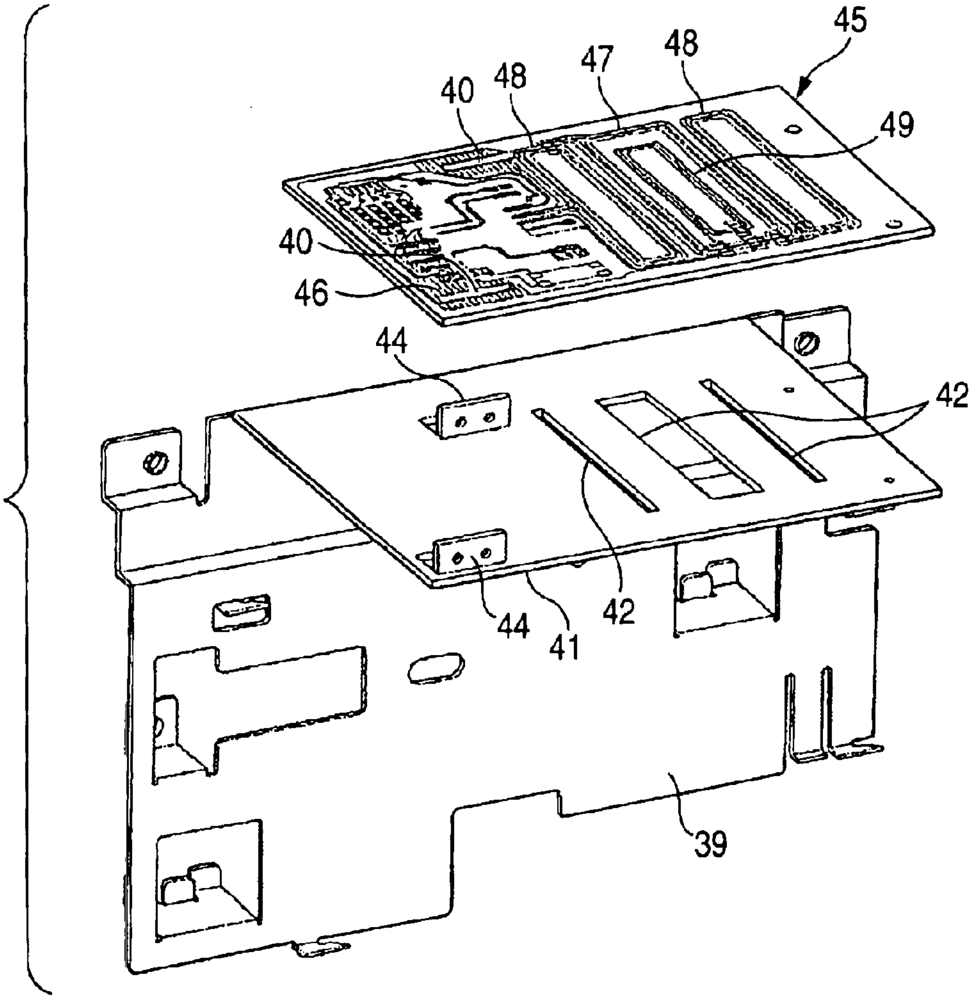
FIG. 6 is a perspective view showing the antenna board which has been mounted to the board mounting plate in the ink jet recording apparatus of FIG. 1.

As shown in FIG. 6, the cut-outs 42 are formed at three positions in the board mounting plate 41. The central cutout 42 is opposed to the transmission antenna 47 and has a shape corresponding to the transmission antenna 47. The cut-outs 42 at both sides are opposed to the cancelers 48 and has a shape corresponding to the cancelers 48.

When the radio signals carrying the predetermined information are transmitted from the transmission antenna 47, the radio waves from the central cut-out 42 directly arrive at the receiving antennas 37Y, 37M, 37C, 37B. However, the radio waves generated from the transmission antenna 47 in a diagonal direction are blocked by the board mounting plate 41 having the radio wave shielding function and hindered from arriving at the receiving antennas. Accordingly, the radio waves are transmitted from the transmission antenna 47 to the receiving antennas with high directivity, and accurate exchange of the information between the transmission antenna 47 and the receiving antennas 37Y, 37M, 37C, 37B is made possible.

As for transmission of the information on the remaining amounts of the ink stored in the IC chips 35Y, 35M, 35C, 35B which are provided in the respective ink cartridges as an example, recording (printing) dot signals are counted in the respective IC chips 35Y, 35M, 35C, 35B, the counted numbers are integrated and stored, and the remaining amounts of the ink are calculated from these integrated values and stored.

When the receiving antennas 37Y, 37M, 37C, 37B pass below the antenna board 45 by the scanning motion of the carriage 23, the receiving antennas 37Y, 37M, 37C, 37B receive the signals transmitted by radio through the cut-outs 42, and load variations occurring on this occasion are detected by the load variation detector 49, thereby to grasp the information which has been stored in the IC chips. The information thus grasped is transmitted to the main board 43 by way of the cable 51, stored there, so that recording activity can be controlled based on this information.

Then, an ink jet recording apparatus 100 of a type provided with ink cartridges on a main body side of the ink jet recording apparatus will be described as a second embodiment of the invention.

Figure 8:
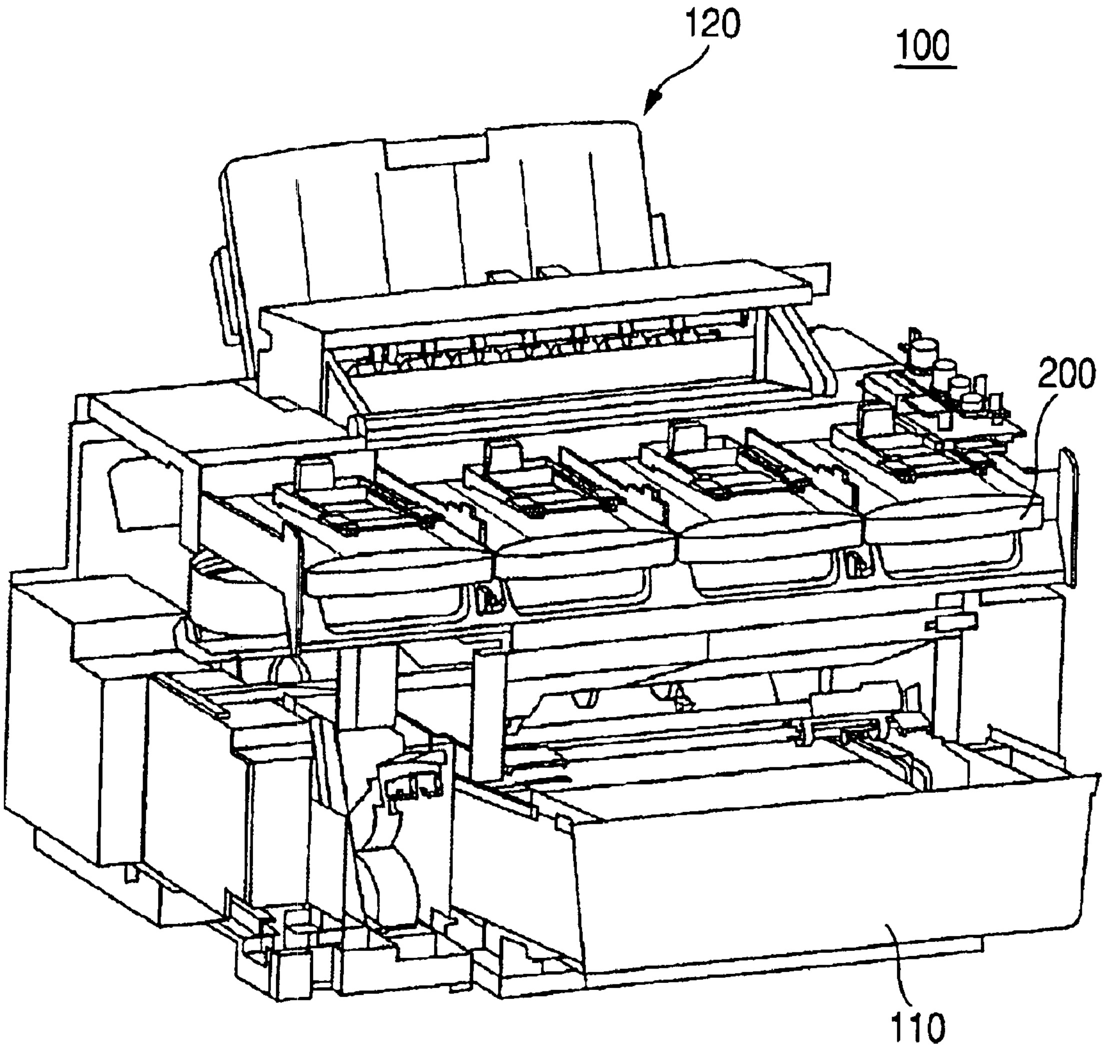
FIG. 8 is a perspective view showing an ink jet recording apparatus according to a second embodiment of the invention.

The ink jet recording apparatus 100 in this embodiment has a recording paper tray 110 which contains recording paper or the like, as shown in FIG. 8, and also has a discharging tray 120 for discharging the recording paper after printing has been done on this recording paper.

Figure 9:
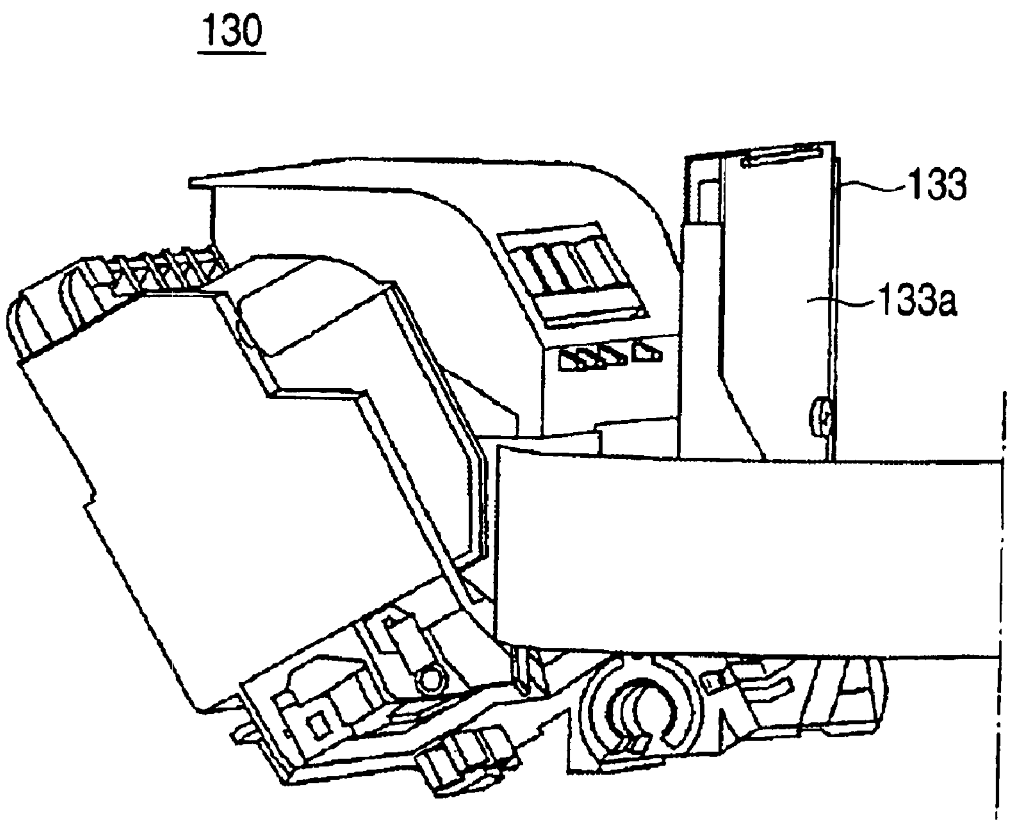
FIG. 9 is a perspective view showing a carriage to be mounted on the ink jet recording apparatus of FIG. 8.

FIG. 9 shows a carriage 130 which reciprocatively carries an ink jet recording head in a primary scanning direction (a widthwise direction of the recording paper) for conducting the printing on this recording paper.

On this carriage 130, there are provided subtanks which contain liquid, for example, ink in four colors, namely, black, yellow, magenta, and cyan, separately. The ink in the respective colors are adapted to be supplied from these subtanks to the ink jet recording head for conducting color printing or the like.

The ink jet recording apparatus 100 in FIG. 8 is not a recording apparatus for personal use, but a recording apparatus to be used in offices or for business use, and has ink reservoirs in other places than the carriage 130 to deal with relatively large amounts of printing. Ink cartridges 200 as shown in FIG. 8 are examples of these ink reservoirs.

In FIG. 8, there are provided four ink cartridges 200 which contain the ink in four colors, black, yellow, magenta, and cyan, respectively, and it is so constructed that the ink are replenished from these ink cartridges 200 for the respective colors to the corresponding subtanks on the carriage 130 by way of ink replenishing tubes.

For this reason, even though the ink in the subtanks in the carriage 130 have been consumed, the ink will be adequately replenished from the ink cartridges 200, so that large amounts of printing can be conducted.

Figure 10:
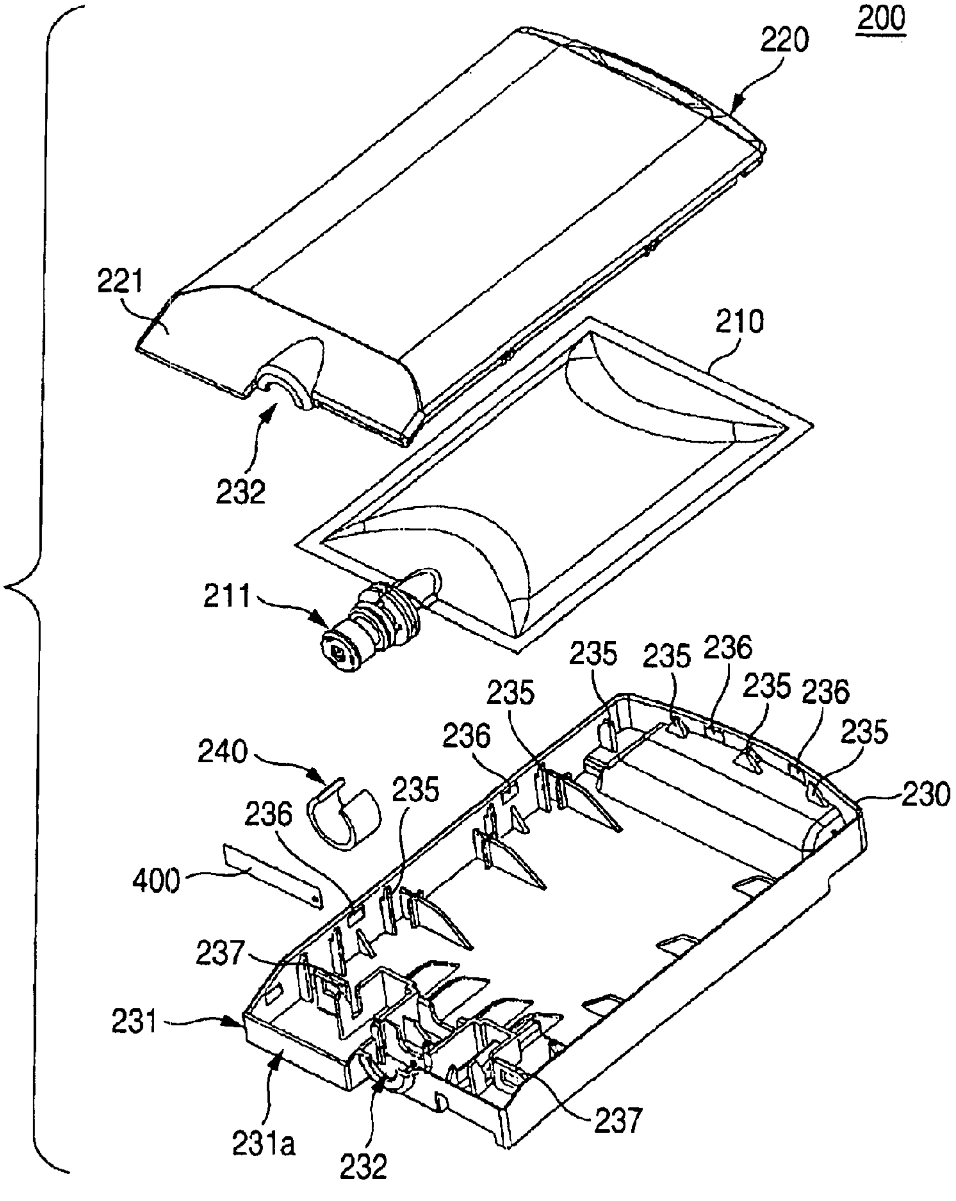
FIG. 10 is an exploded perspective view showing an ink cartridge to be mounted on the ink jet recording apparatus of FIG. 8.

As shown in FIG. 10, each of the ink cartridges 200 includes an ink pack 210 which sealingly contains the ink, and an upper case 220 and a lower case 230 for enclosing this ink pack 210.

Figure 11:
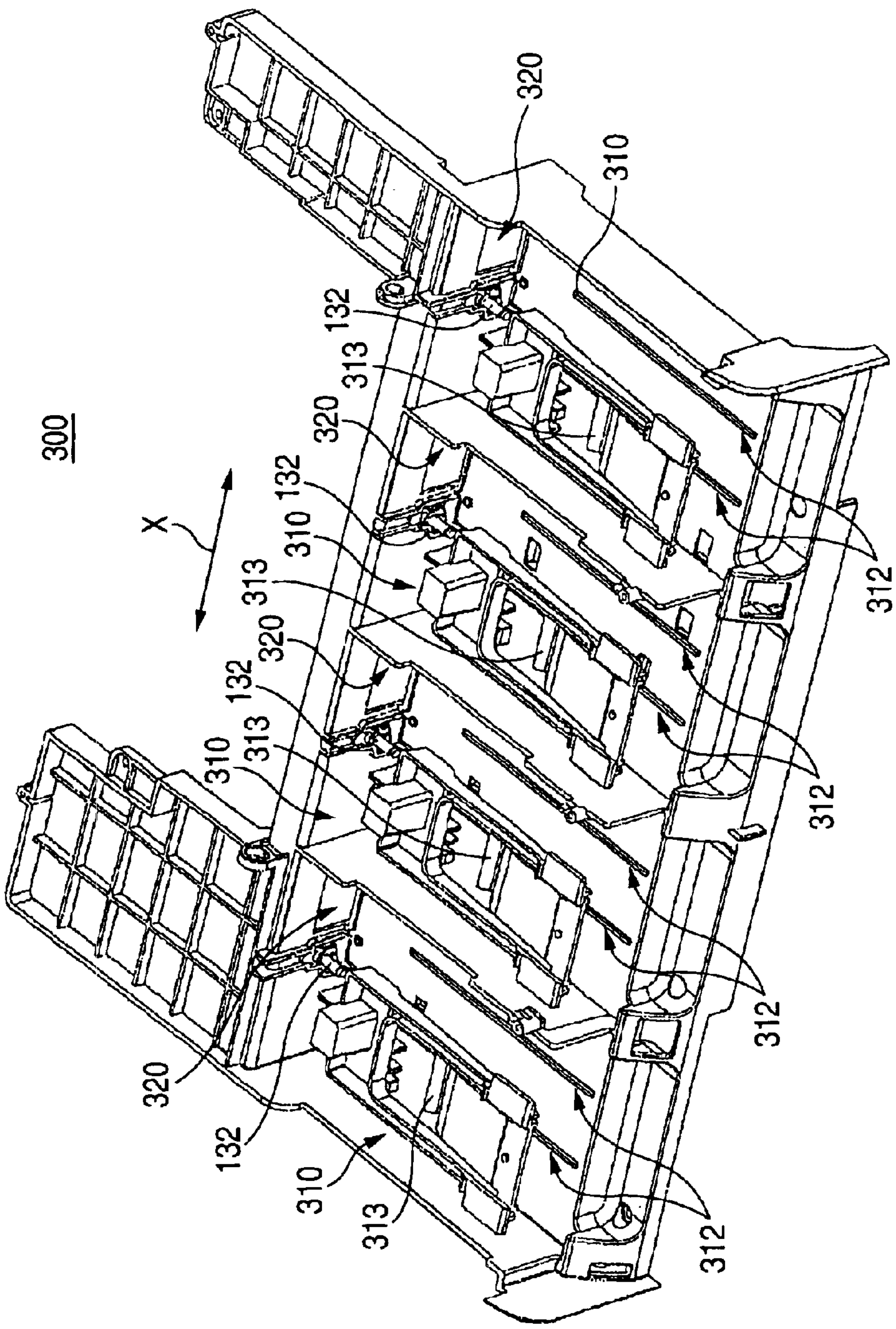
FIG. 11 is a perspective view showing an ink cartridge holder on which the ink cartridge of FIG. 10 is arranged.

As shown in FIG. 11, an ink cartridge holder 300 on which the above described ink cartridges 200 are arranged has four cartridge mounting parts 310 for receiving a plurality of, for example, four ink cartridges 200.

These cartridge mounting parts 310 are formed horizontally and arranged in parallel along a moving direction of the carriage 130 (in a direction of an arrow X in FIG. 11).

Figure 12:
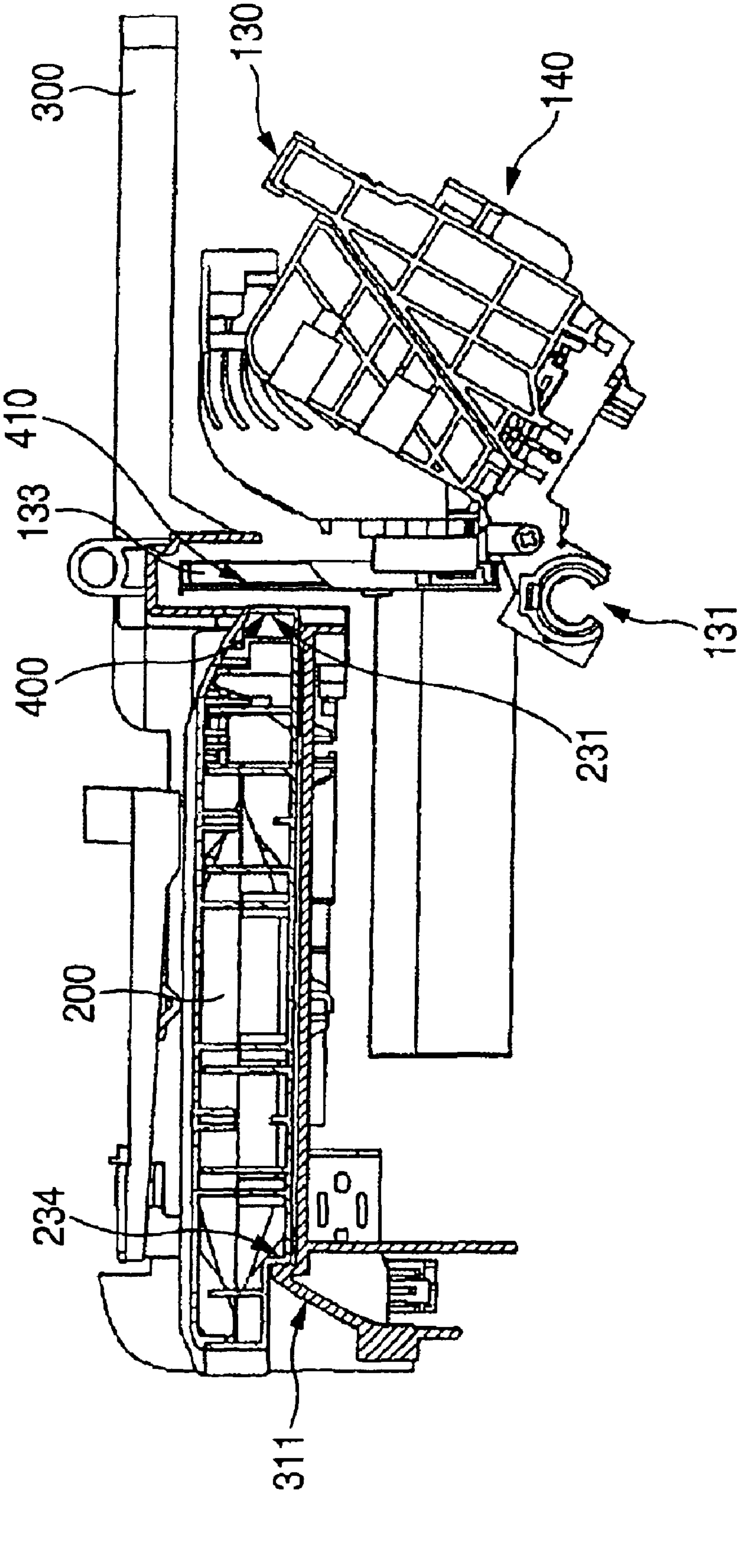
FIG. 12 is an explanatory view showing relation of the ink cartridge with respect to the carriage, in a state where the ink cartridge has been arranged on the ink cartridge holder of FIG. 11.

As shown in FIG. 12, the carriage 130 contains an ink jet recording head 140. Because the carriage 130 moves in a direction perpendicular to a paper face, the carriage moves in the direction of the arrow X in FIG. 11 and along proximity of the ink cartridge holder 300.

By the way, each of the ink cartridges 200 which are arranged on the ink cartridge holder 300 is provided with a protrusion 231 projecting toward the carriage 130, at a position close to the carriage 130 (the right side in FIG. 12).

The ink pack 210 is formed with an ink outlet 211, as shown in FIG. 10. This ink outlet 211 is connected to an ink guiding needle 132 which is provided in the ink cartridge holder 300 of FIG. 11, so that the ink within the ink pack 210 can be introduced to the subtank in the carriage 130 by way of the ink outlet 211, the ink guiding needle 132 and the ink replenishing tube.

For this reason, it is concerned that an ink leakage may happen when the ink outlet 211 is connected to the ink guiding needle 132, and therefore, the ink outlet 211 is provided with an ink absorbing material 240, as shown in FIG. 10.

Moreover, in an area where this ink outlet 211 is provided, there is formed a case opening 230 for example, which is an opening of the cases, as shown in FIG. 10. The ink outlet 211 has such a structure capable of being connected to the ink guiding needle 132 of FIG. 11, by positioning the ink outlet 211 of the ink pack 210 in this case opening 232.

Further as shown in FIG. 10, an IC label 400 is arranged inside a forward end face 231*a* of the protrusion 231.

The IC label 400 is a tape-shaped member provided with ICs or antennas embedded therein, and stores data concerning a kind of the ink, a remaining amount of the ink, a serial number, and an expiry date of the ink in the ink cartridge 200 to which the IC label is attached. It is to be noted that communication can be conducted if at least an antenna portion of the IC label 400 is provided in the protrusion 231.

On the other hand, the ink cartridge holder 300 is provided with windows 320 as shown in FIG. 11, at a side close to the carriage 130 in the cartridge mounting parts 310. The protrusions 231 of FIG. 10 are adapted to be opposed to these windows 320.

In addition, the carriage 130 is provided with a plate portion 133 as shown in FIGS. 9 and 12, and this plate portion 133 is positioned in proximity of the windows 320 of the ink cartridge holder 300 so as to be opposed thereto, as shown in FIG. 12.

An antenna board 410 is arranged on a back side of a face 133*a* (see FIG. 9) of the plate portion 133, as shown in FIG. 12. A distance between the antenna of the IC label 400 and an antenna of the antenna board 410 is set to be from about 3 mm to 10 mm. When the antenna board 410 has approached the ink cartridge 200 as the carriage 130 moves, the information such as the remaining amount of the ink which has been stored in the IC label is reliably transmitted to the antenna board 410 in a non-contact manner.

Then, on the basis of the information such as the remaining amount of the ink, the ink jet recording apparatus 100 controls ejection of the ink from the ink jet recording head 140 and so on.

At least surrounding areas of the windows 320 of the ink cartridge holder 300 are formed of sheet iron, and therefore, the surrounding areas except the windows 320 have radio wave shielding function. In this manner, the windows 320 performs substantially the same function as the cut-outs 42 which have been described referring to FIG. 6.

Specifically, when the radio waves carrying the predetermined information are transmitted from the antenna part of the IC label 400, the radio waves directly arrives at the antenna board 410 through the window 320. However, the radio waves transmitted from the antenna part of the IC label 400 in a diagonal direction are blocked by the sheet iron in the surrounding area of the window 320 having the radio wave shielding function and hindered from arriving at the antenna board 410. Accordingly, the radio waves are transmitted from the antenna part of the IC label 400 to the antenna board 410 with high directivity, thus enabling exchange of the information between the antenna part of the IC label 400 and the antenna board 410 to be conducted accurately. Even in a case where the radio waves are transmitted from the antenna board 410 to the antenna part of the IC label 400, substantially the same radio wave shielding function is performed.

Further, the cartridge mounting parts 310 are formed horizontally and arranged in parallel along the moving direction of the carriage 130, as shown in FIG. 11, and the windows 320 are formed at a side close to the carriage 130.

For this reason, a distance between the antenna board 410 and the antenna part of the IC label 400 can be easily adjusted to such a distance that the communication may be possible by the movement of the carriage 130 in the direction of the arrow X.

Consequently, there is no need of providing a plurality of antenna boards respectively corresponding to the IC labels 400 of the ink cartridges 200, but the single antenna board 410 which is provided on the plate portion 133 of the carriage 130 can conduct communication of the information with the plurality of the IC labels 400. Therefore, as compared with a case wherein connecting terminals are respectively provided for the ink cartridges to perform a contact basis communication, the cost can be remarkably reduced.

Figure 13:
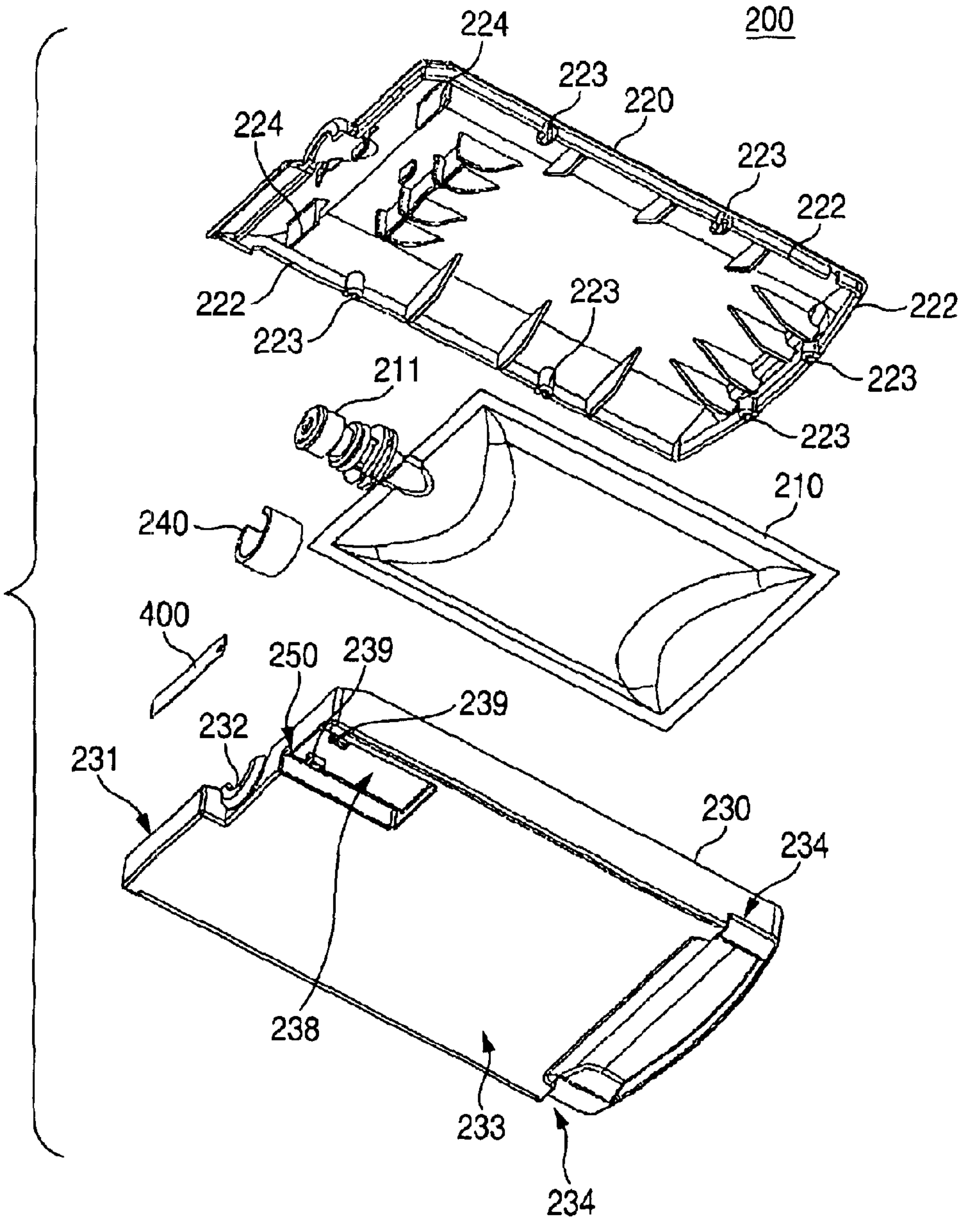
FIG. 13 is an exploded perspective view of the ink cartridge of FIG. 10, as seen from below.

The lower case 230 is provided with a plurality of, for example two positioning recesses 234 which are adapted to be engaged with the cartridge mounting part 310 for positioning, as shown in FIG. 13, on a bottom face 233 of the lower case 230, that is, a face opposed to the cartridge mounting part 310 to be placed thereon. These positioning recesses 234 are provided at an opposite end part to the case opening 232 of the lower case 230.

Figure 14:
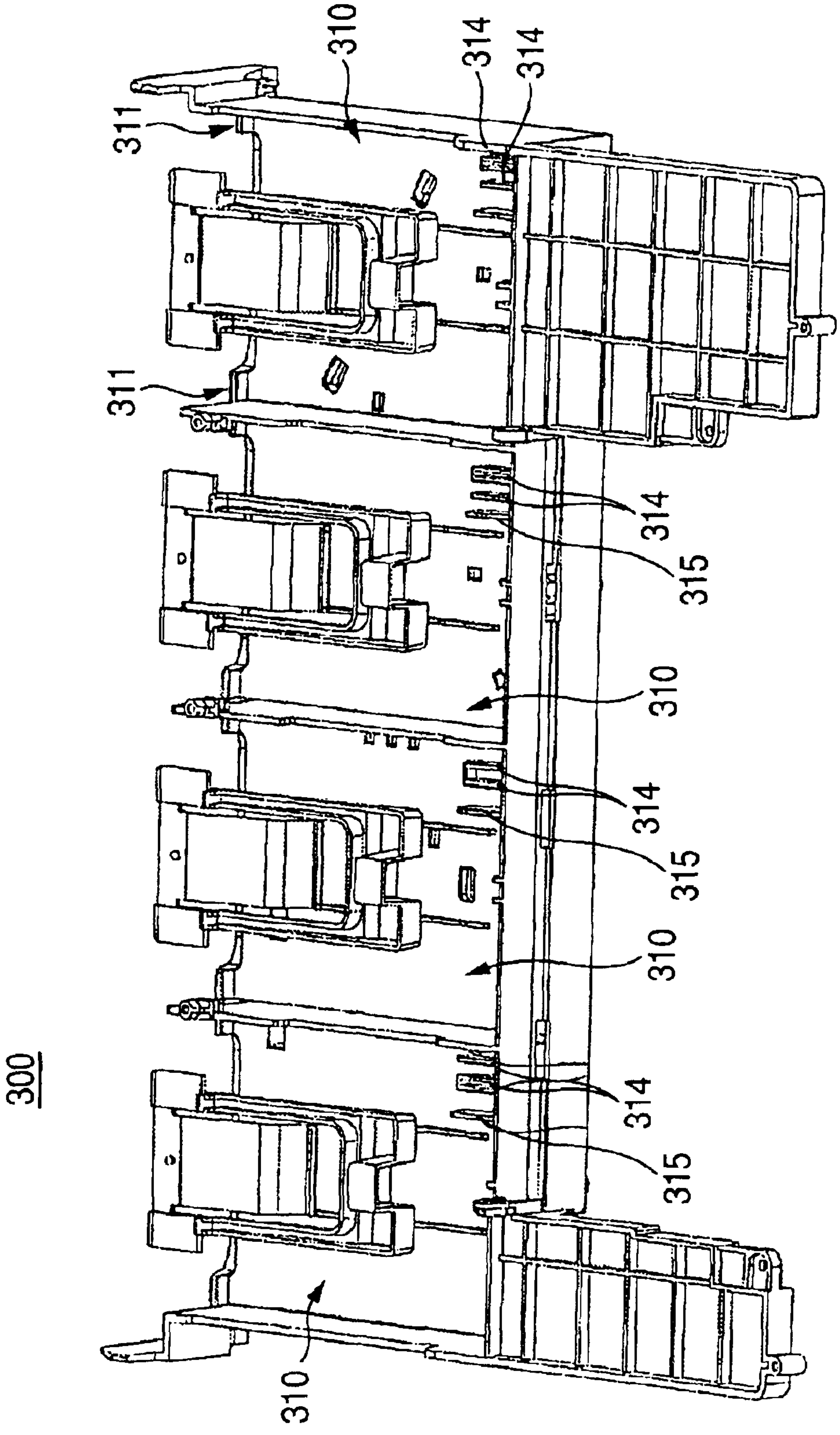
FIG. 14 is a perspective view of the ink cartridge holder of FIG. 11, as shown in a different angle.

As shown in FIG. 14, each of the cartridge mounting parts 310 is provided with a pair of supporting members 311 corresponding to the two positioning recesses 234.

Therefore, when the ink cartridge 200 has been arranged on the ink cartridge holder 300, the positioning recesses 234 are adapted to be engaged with the supporting members 311, as shown in FIG. 12. On this occasion, the ink guiding needle 132 of FIG. 11 is inserted into the ink outlet 211 of the ink cartridge 200 of FIG. 10 to establish the connection therebetween.

As the results, the ink cartridge 200 is positioned on the cartridge mounting part 310 with high precision, at three positions in total, including the ink guiding needle 132 and two positioning recesses 234. In this manner, because the protrusion 231 of the ink cartridge 200 of FIG. 10 can be also accurately opposed to the window 320 of FIG. 11, the distance between the antenna board 410 of the carriage 130 and the IC label 400 of the ink cartridge 200 can be set within an appropriate range, and communication with high precision is always possible.

Moreover, positioning can be effected with the simple structure that the positioning recesses 234 are only engaged with the cartridge supporting members 311, and thus, a low cost positioning mechanism can be obtained.

Further, because the protrusion 231 is provided close to the ink guiding needle 132 which serves also as the positioning member, the protrusion 231 can be more accurately positioned. Accordingly, the distance between the antenna board 410 of the carriage 130 and the IC label 400 can be maintained more accurately, and communication with higher precision is made possible.

Moreover, it is so constructed that the ink pack 210 can be easily contained in the case of the ink cartridge 200, because the case is divided into the upper case 220 and the lower case 230, as shown in FIG. 13.

In addition, the lower case 230 is provided with a part of the case opening 232, the two positioning recesses 234, and the protrusion 231. Because all the members for performing the positioning function are provided in the lower case 230, the lower case 230 can be positioned with higher precision than the upper case 220. Since the protrusion 231 is formed in the lower case 230 having such a structure, the IC label 400 which is arranged in the protrusion 231 can be positioned with higher precision, and the distance from the antenna, board 410 of the carriage 130 to the IC label 400 can be more accurately maintained, thus, enhancing communicating accuracy.

Figure 15A:
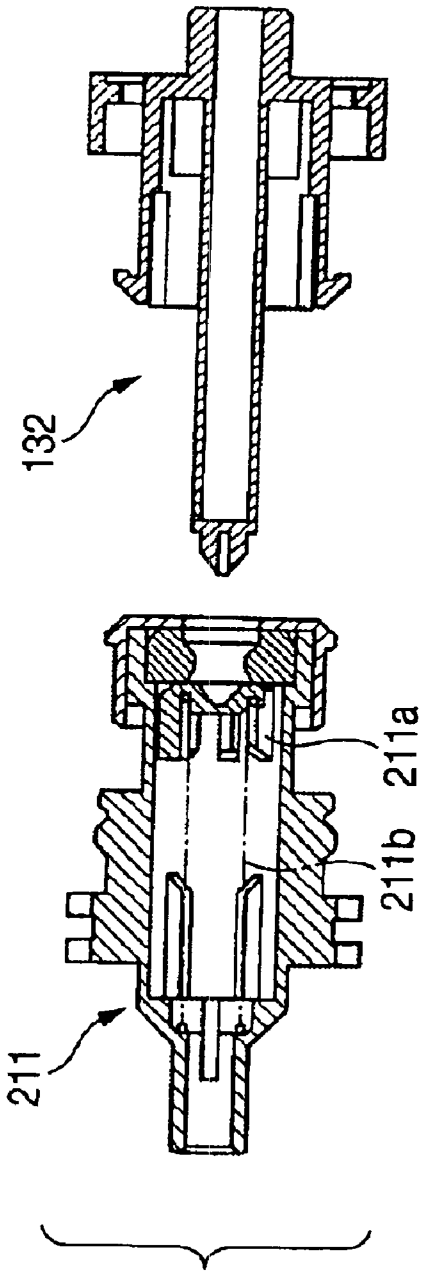
FIG. 15A is a sectional view showing relation of an ink guiding needle of FIG. 11 with respect to an ink outlet of FIG. 10.
Figure 15B:
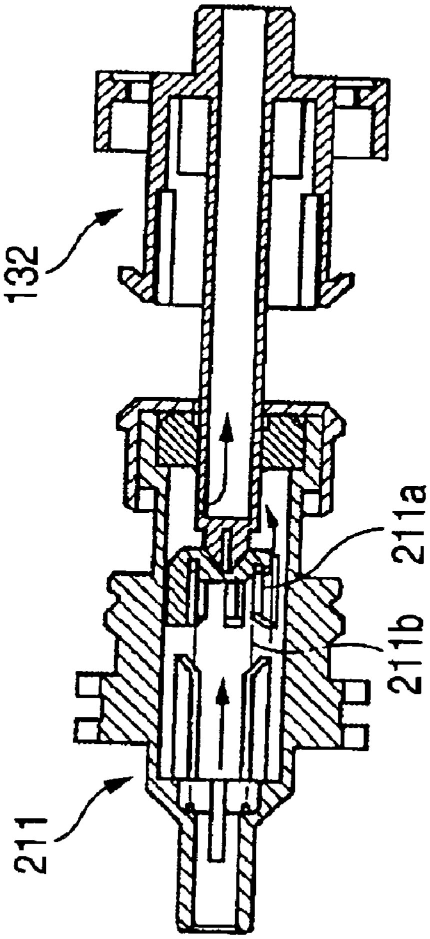
FIG. 15B is a sectional view showing the ink guiding needle in a state inserted into the ink outlet.

As shown in FIG. 15A, the ink outlet 211 is provided with a plug body 211 a which is movable in a longitudinal direction of the ink guiding needle 132. This plug body 211*a* is urged by a spring 211*b* in a direction of closing the ink outlet 211. Specifically, the plug body 211*a* is pushed to the right in the drawing as shown in FIG. 15A, to put the ink outlet 211 in a closed state. When a distal end of the ink guiding needle 132 has come into contact with the plug body 211*a* in this state to push it to the left in the drawing as shown in FIG. 15B, the plug body 211*a* is also moved to the left, so that the ink outlet 211 becomes an open state, as shown in FIG. 15B. Accordingly, the ink outlet 211 is so constructed as to be closed by spring force of the spring 211*b*, during transportation or the like of the ink cartridge 200, so that the ink contained inside may not leak.

By arranging the ink cartridge 200 in the cartridge mounting part 310 with the positioning recesses 234 engaged with the cartridge supporting members 311 of the cartridge mounting part 310, and by inserting the ink guiding needle 132 into the ink outlet 211, the ink can be easily supplied to the ink guiding needle 132.

Further, when the plug body 211*a* is pushed to the left by the ink guiding needle 132, the force of the spring 211*b* is exerted to move the whole ink cartridge 200 to the left in FIG. 12.

However, the positioning recesses 234 of the ink cartridge 200 come into contact with the cartridge supporting members 311 of the cartridge mounting part 310, as shown in FIG. 12. Therefore, not only the leftward movement of the ink cartridge 200 can be prevented beforehand, but also accurate positioning can be realized.

Moreover, in a case where the ink outlet 211 is in an open state, the spring force of the spring 211*b* is transmitted to the lower case 230, thereby enabling the positioning recesses 234 to be reliably engaged with the cartridge supporting member 311.

Figure 16:
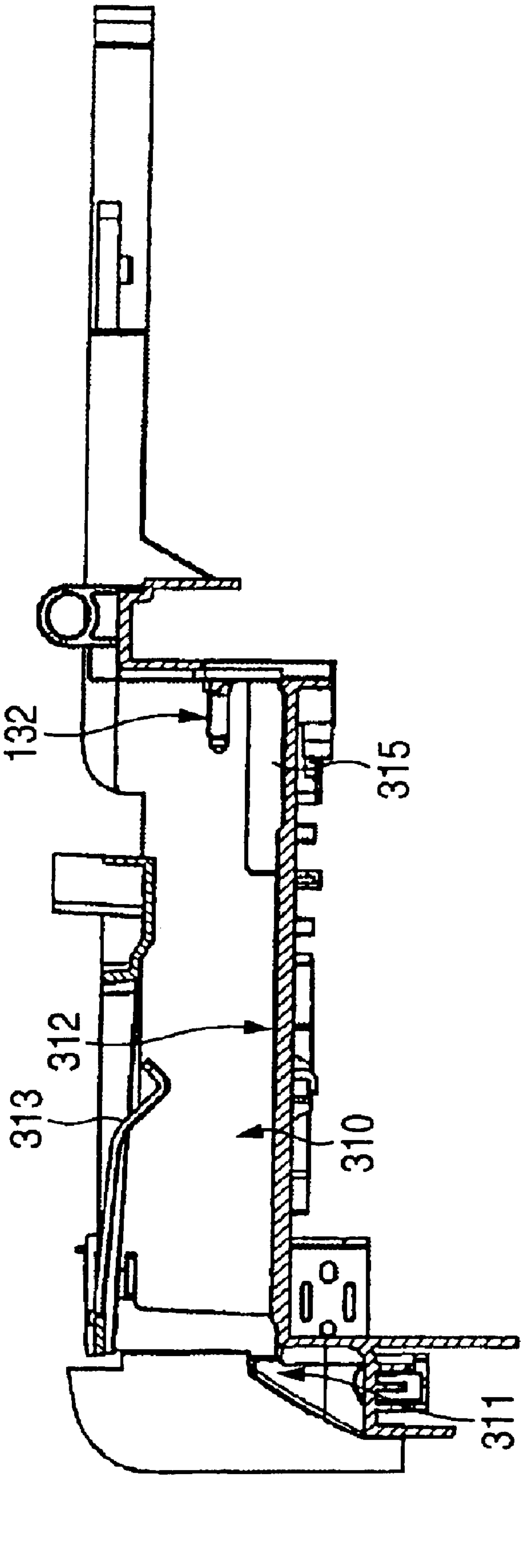
FIG. 16 is a sectional view of the ink cartridge holder of FIG. 11 showing an ink cartridge mounting part.

As shown in FIG. 11, each of the cartridge mounting parts 310 is formed with a mounting face 312 on which the ink cartridge 200 is directly mounted, and is further provided with a holding spring 313 for pushing an upper face of the mounted ink cartridge 200 toward the mounting face 312. As shown in FIG. 16, the holding spring 313 is arranged so as to be urged toward the mounting face 312 which is located in the lower part in FIG. 16.

After the ink cartridge 200 has been arranged in the cartridge mounting part 310 in FIG. 16, the positioning recesses 234 in the backward end of the ink cartridge 200 are rendered to be engaged with the supporting members 311, and then, the ink guiding needle 132 is inserted into the ink outlet 211.

By further pressing the ink cartridge 200 onto the mounting face 312 from the above by the holding spring 313, the ink cartridge 200 is positioned at four positions in total, namely by the ink guiding needle 132, the two supporting members 311, and the holding spring 313, so that positioning with higher precision can be made.

Referring back to FIG. 10, the upper case 220 of the ink cartridge 200 is provided, at a side having the case opening 232, with a slope face 221 which is inclined toward an outer edge. This slope face 221 guides the holding spring 313 of FIG. 16 to the upper face of the upper case 220. Specifically, when the ink cartridge 200 of FIG. 10 has been introduced into the cartridge mounting part 310 of FIG. 16 from the left, the slope face 221 of the upper case 220 comes in contact with a distal end of the holding spring 313 to guide this distal end of the holding spring 313. Then, the distal end of the holding spring 313 thus guided is arranged on the upper face of the upper case 220 in association with the insertion of the ink cartridge 200.

Figure 17:
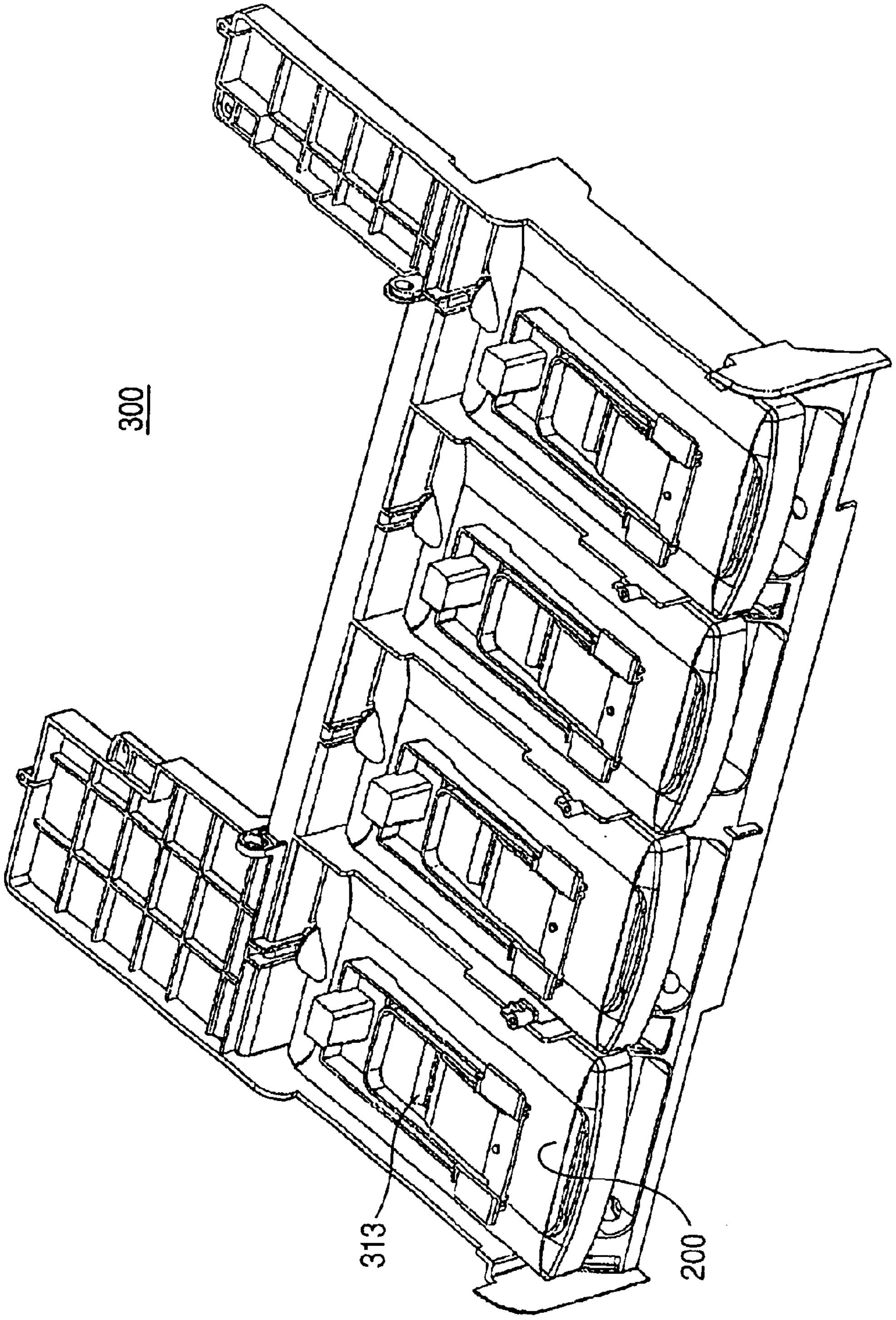
FIG. 17 is a perspective view of the ink cartridges of FIG. 10 in a state arranged in the ink cartridge mounting parts of FIG. 16.

FIG. 17 is a perspective view schematically showing the ink cartridges 200 in a state arranged in the cartridge mounting parts 310. Each of the holding springs 313 is located on the upper face of the upper case 220 of the ink cartridge 200, and serves to press the upper face toward the mounting face 312.

As described above, the upper case 220 is formed with the slope face 221, and therefore, when the ink cartridge 200 is inserted, the insertion will not be hindered by the holding spring 313, but the ink cartridge 200 can be smoothly positioned in the cartridge mounting part 310.

Figure 18:
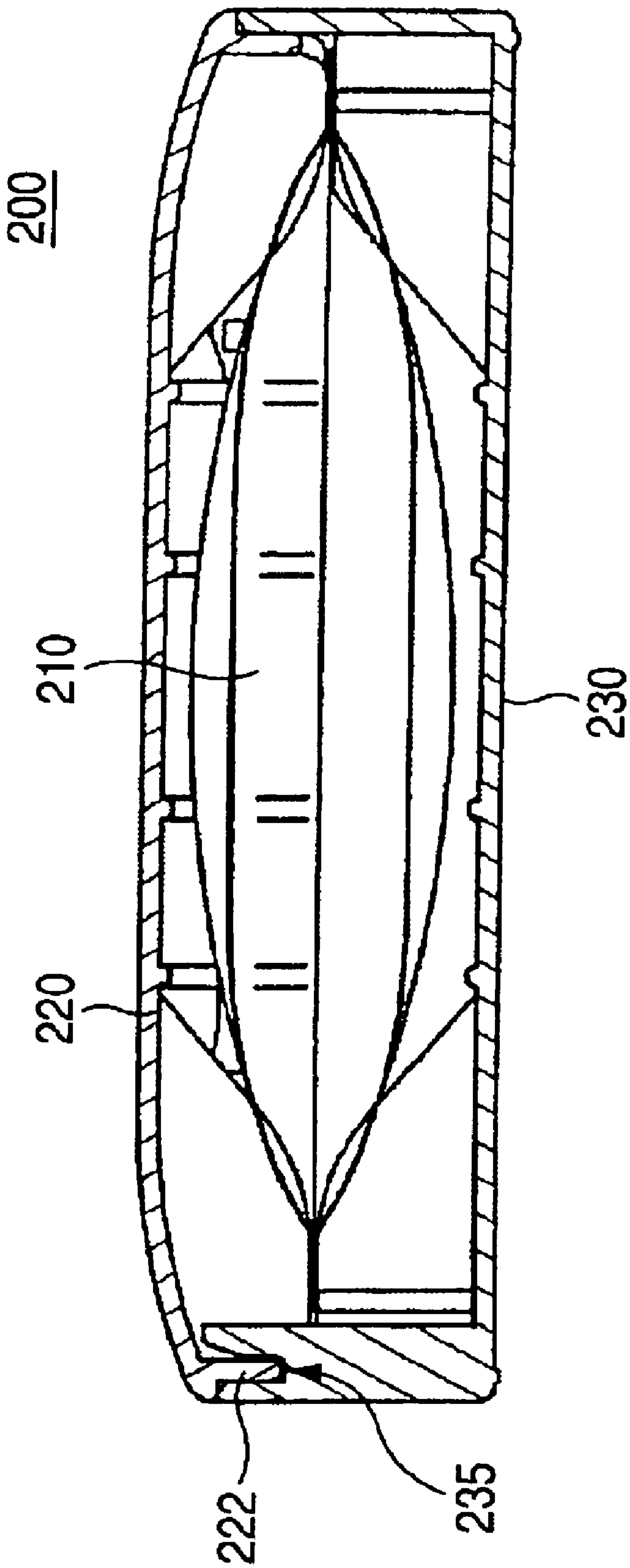
FIG. 18 is a sectional view showing the ink cartridge of FIG. 10 in a state where a ridge of an upper case is meshed with a groove of a lower case.

Referring back to FIG. 13, the upper case 220 is provided with ridges 222, for example at three positions of the outer circumference, namely, on longer edges and a shorter edge at the backward end. On the other hand, the lower case 230 is provided with fifteen grooves 235 corresponding to the ridges 222, as shown in FIG. 10. These ridges 222 are adapted to be fitted with the grooves 235, as shown in FIG. 18. The ridges 222 are received in the grooves 235 without creating large gaps therebetween.

As shown in FIG. 13, the upper case 220 is formed with projections 223 at six positions for example, along its outer circumference. In correspondence with these projections 223, the lower case 230 is formed with recesses 236 at six positions for example, along its outer circumference, as seen in FIG. 10.

Figure 19:
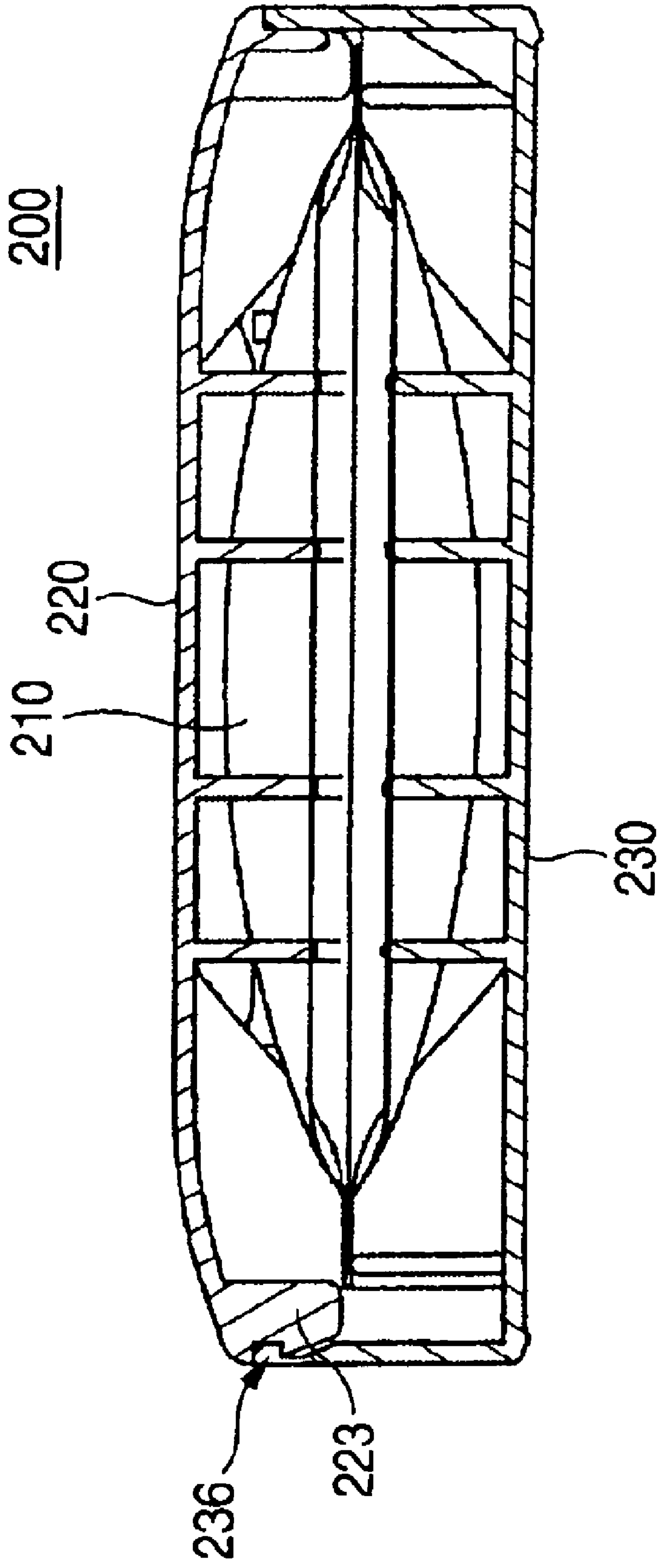
FIG. 19 is a sectional view showing the ink cartridge of FIG. 10 in a state where a fitting projection of the upper case is engaged with a fitting recess of the lower case.

As shown in FIG. 19, the projections 223 are engaged with the recesses 236, so that the upper case 220 may not be easily detached from the lower case 230. In this manner, the upper case 220 and the lower case 230 are engaged with each other by fitting the ridges 222 into the grooves 235 at the outer circumferences thereof. In addition, the projections 223 of the upper case 220 and the recesses 236 are engaged with each other. Consequently, the upper case 220 and the lower case 230 are rigidly coupled to each other.

As shown in FIG. 13, the upper case 220 is further provided with hooks 224 at two positions for example, in an area inwardly apart from the outer circumference. In the lower case 230, receivers 237 corresponding to these projections 224 are arranged, as shown in FIG. 10. Each of these receivers 237 has a through hole to which a distal end of the hook 224 is engaged.

Figure 20:
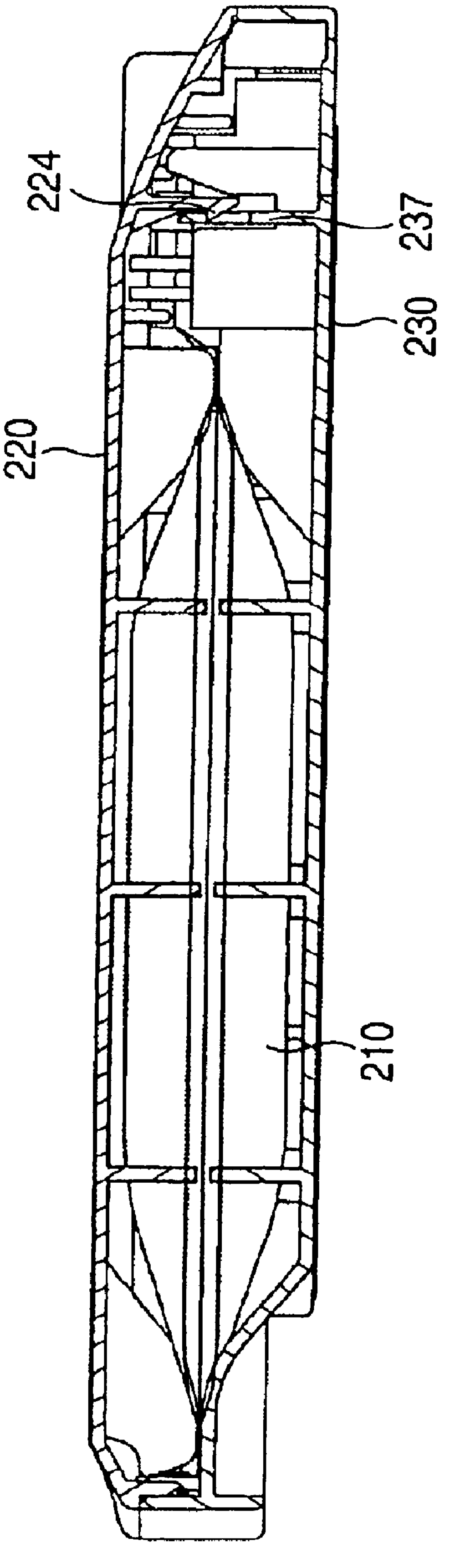
FIG. 20 is a sectional view showing the ink cartridge of FIG. 10 in a state where a projected locking piece of the upper case is engaged with a locking piece receiver of the lower case.

As shown in FIG. 20, the hook 224 is rigidly engaged in the through hole of the receiver 237. In this manner, the hooks 224 and the receivers 237 are formed in the upper case 220 and the lower case 230 in the areas apart from the outer circumferences thereof, in short, in the areas apart from borders between the upper case 220 and the lower case 230.

In case where the ink cartridge 200 receives a shock when it is dropped during transportation or the like, both the upper case 220 and the lower case 230 may be deformed. In this case, there is such an anxiety that engagements between the projections 223 and the recesses 236 provided on the outer circumferences which are the borders between the upper case 220 and the lower case 230 may be released to detach the upper and lower cases.

However, in the present embodiment; since the projected locking pieces 224 and the locking piece receivers 237 are arranged in the areas apart from the outer circumferences of the upper case 220 and the lower case 230, influence due to deformation of the upper case 220 and the lower case 230 will not be large, and the engagement between both the upper and lower cases will not be easily released. As the results, the case will not be easily detached even though a shock of drop or the like is happened, and occurrences of such defects that the ink cartridge 200 cannot be mounted on the ink jet recording apparatus 100 and the data in the IC cannot be received can be prevented beforehand.

As shown in FIG. 13, the lower case 230 is formed with a dented part 238 in a substantially cubic form on a lower face thereof. A plurality of ribs 239 are formed so as to protrude from a bottom face of this dented part 238. A plurality of these ribs 239 serve as an identifier.

On the other hand, each of the four cartridge mounting parts 310 are formed with ribs 314, as shown in FIG. 14. These ribs 314 have different shapes from one another. Therefore, in a case where the ribs 239 of the ink cartridge 200 correspond with the ribs 314 of the cartridge mounting part 310 in shape, the ink cartridge 200 can be correctly arranged without being abutted against the ribs 314 of this cartridge mounting part 310. In case where the shapes are inconsistent, the ink cartridge 200 is blocked by the ribs 314 of the cartridge mounting part 310 and cannot be correctly arranged. Specifically the ink cartridge 200 contains either one of the ink in the four colors, black, yellow, magenta and cyan as described above, and a place for arranging the ink cartridge 200 containing the ink in the specific color is specified.

Accordingly, the cartridge mounting part 310 of FIG. 14 is formed with the ribs 314 so that the other ink cartridges 200 than the ink cartridge 200 for the relevant color cannot be inserted. Because the ink cartridge 200 is also adapted to contain the ink in the specific color, the ink cartridge 200 is provided with the ribs 239 having the shapes corresponding to the ribs 314 of the cartridge mounting part 310 for the purpose of identifying the color.

For example, when a user is going to place by mistake the ink cartridge 200 containing the black ink in the cartridge mounting part 310 for the yellow ink, the ink cartridge 200 is abutted against the ribs 314 of the cartridge mounting part 310 and cannot be mounted, and thus, the user can immediately recognize the mistake. Therefore, an error of arranging the ink cartridge 200 for a different color can be prevented beforehand.

Moreover, because the ribs 239 of the ink cartridge 200 are formed inside the dented part 238 as shown in FIG. 13, tip ends thereof are not projected from a surface of the lower case 230. Therefore, when the ink cartridge 200 is transported in a package or the like, the ribs 239 will not tear the package, and deterioration in value of the product can be prevented beforehand.

As shown in FIG. 13, a groove 250 is formed in the dented part 238 of the lower case 230 of the ink cartridge 200. On the other hand, as shown in FIGS. 14 and 16, the cartridge mounting part 310 is provided with a rib 315 having a shape which corresponds to the relevant groove 250 only in a case where the ink cartridge has been arranged in a correct position.

When the ink cartridge 200 has been arranged upside down by mistake, or the forward end and the backward end have been arranged in a reverse direction, the rib 315 of the cartridge mounting part 310 is not consistent with the groove 250 of the lower case 230, but the ink cartridge 200 is abutted against the rib 315 and cannot be correctly arranged.

Figure 21:
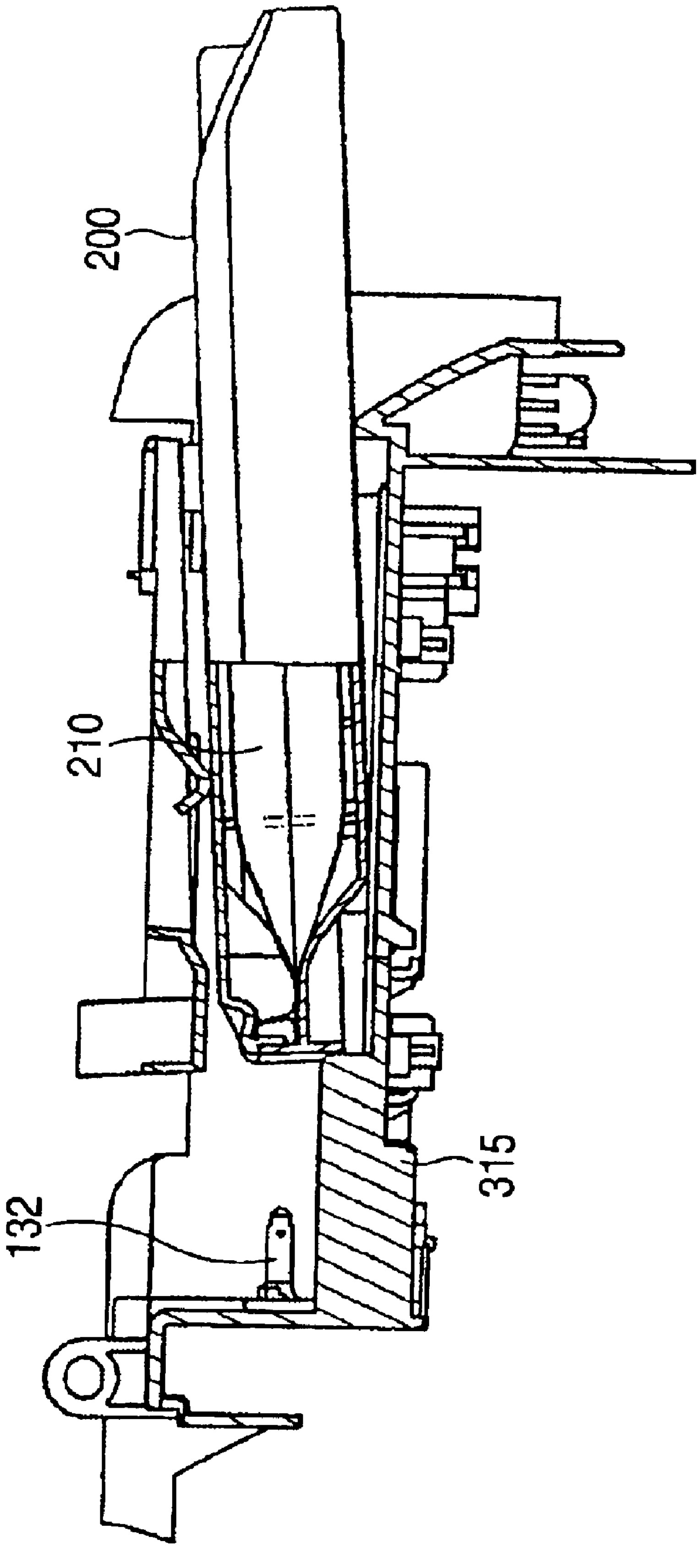
FIG. 21 is an explanatory view showing the ink cartridge of FIG. 10 in a state inserted into the ink cartridge holder of FIG. 11 upside down.

More specifically, in a state where the ink cartridge 200 has been inserted upside down as shown in FIG. 21, the slope face 221 of the upper case 220 is abutted against the rib 315, and the ink cartridge 200 cannot be correctly arranged. On this occasion, the ink cartridge 200 is stopped by the rib 315 before a part of the ink cartridge arrives at the ink guiding needle 132, and therefore, the ink cartridge 200 is prevented from damaging the ink guiding needle 132 due to the reverse insertion or the like.

Figure 22:
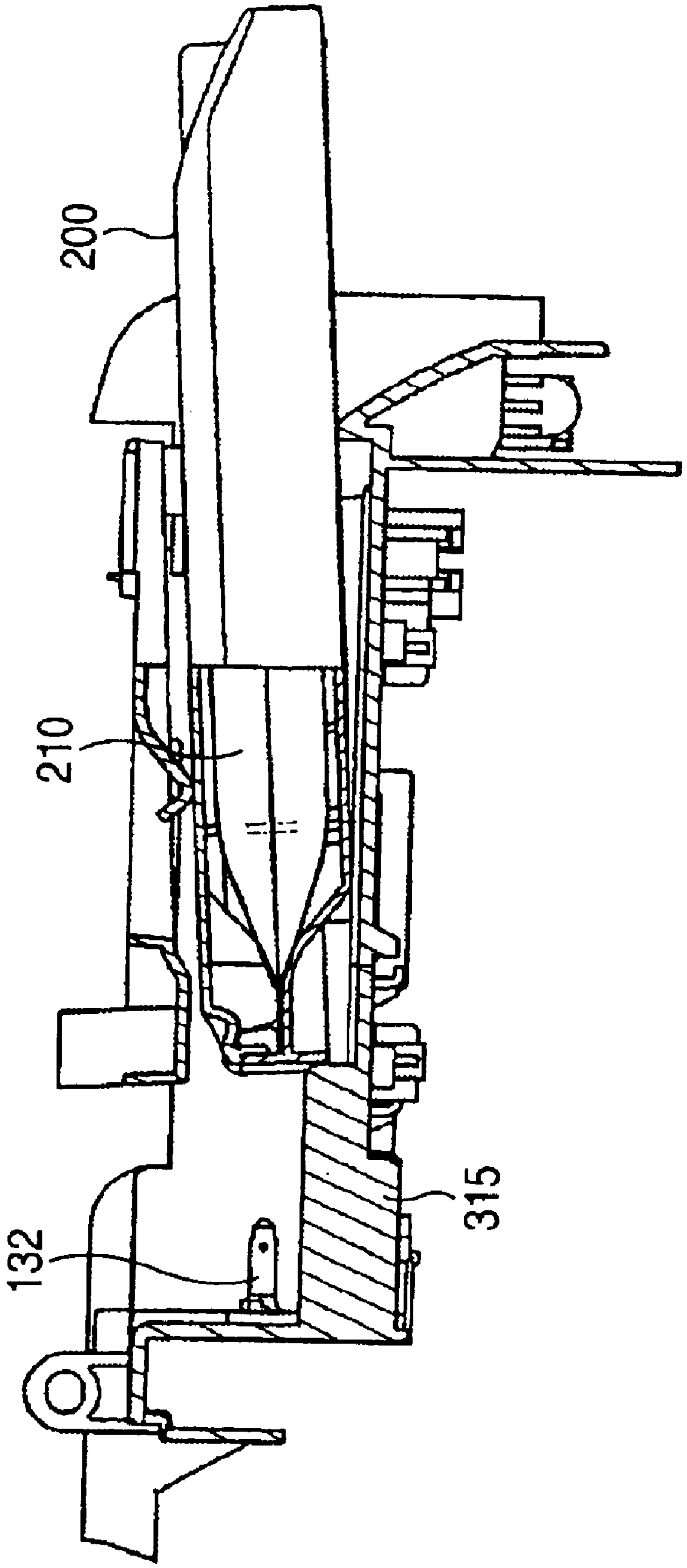
FIG. 22 is an explanatory view showing the ink cartridge of FIG. 10 in a state inserted into the ink cartridge holder of FIG. 11 in a reverse direction.

In case where the ink cartridge 200 is inserted in a reverse direction as shown in FIG. 22, the backward end of the ink cartridge 200 is abutted against the rib 315 and the ink cartridge 200 cannot be correctly arranged.

Figure 23:
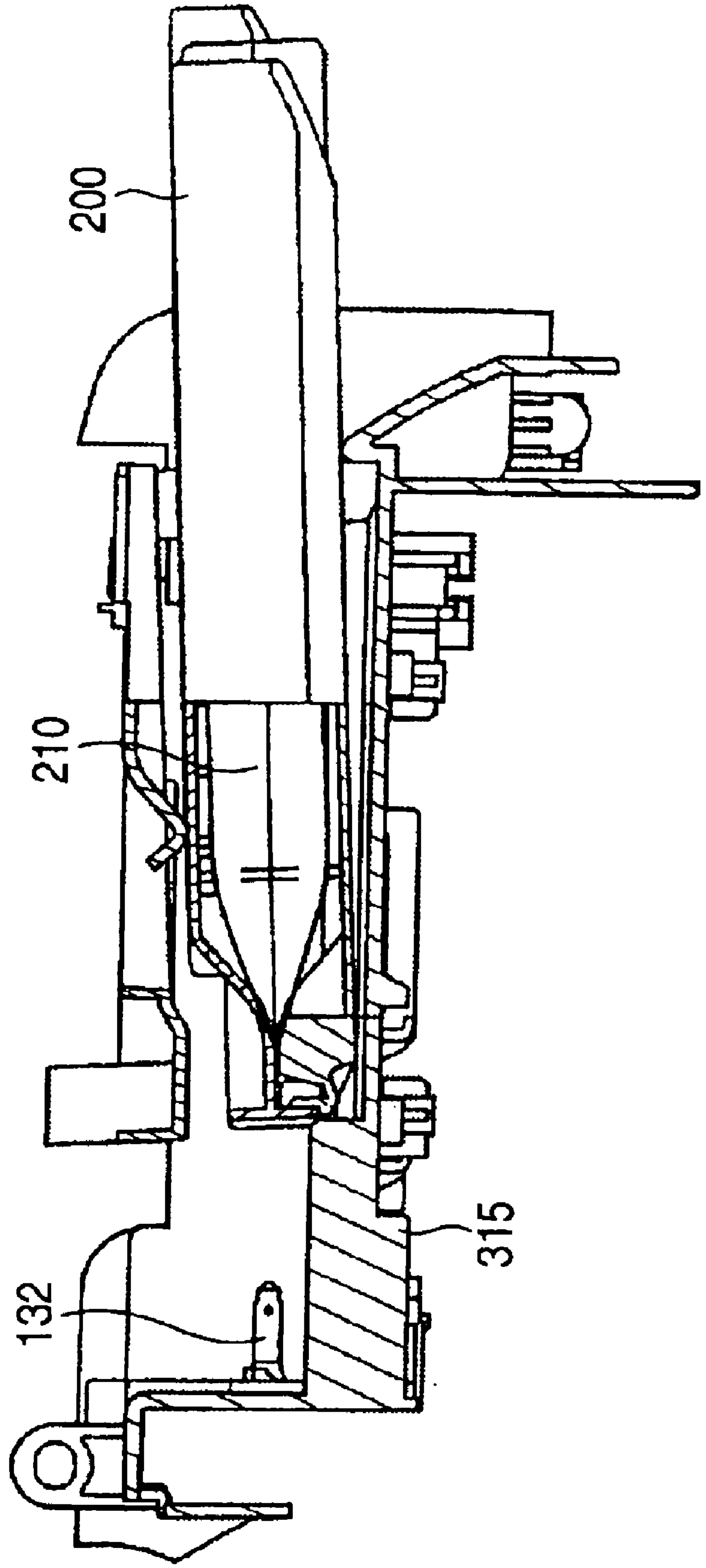
FIG. 23 is an explanatory view showing the ink cartridge of FIG. 10 in a state inserted into the ink cartridge holder of FIG. 11 upside down and in a reverse direction.

Further in a case where the ink cartridge 200 is arranged upside down and in a reverse direction as shown in FIG. 23, the ink cartridge 200 cannot be correctly arranged in the same manner as in FIGS. 21 and 22.

The reverse insertion can be reliably prevented by a simple structure of this embodiment in which the rib 315 and the groove 250 are formed, and breakage of the ink guiding needle 132 due to the wrong insertion can be prevented beforehand.

Next, a third embodiment of the invention will be described. Most components of the ink jet recording apparatus according to the present embodiment are common with those components of the ink jet recording apparatus 100 according to the above described second embodiment. Therefore, the same components will be denoted with the same reference numerals, omitting their explanation, and those components having different features will be mainly described below.

Figure 24:
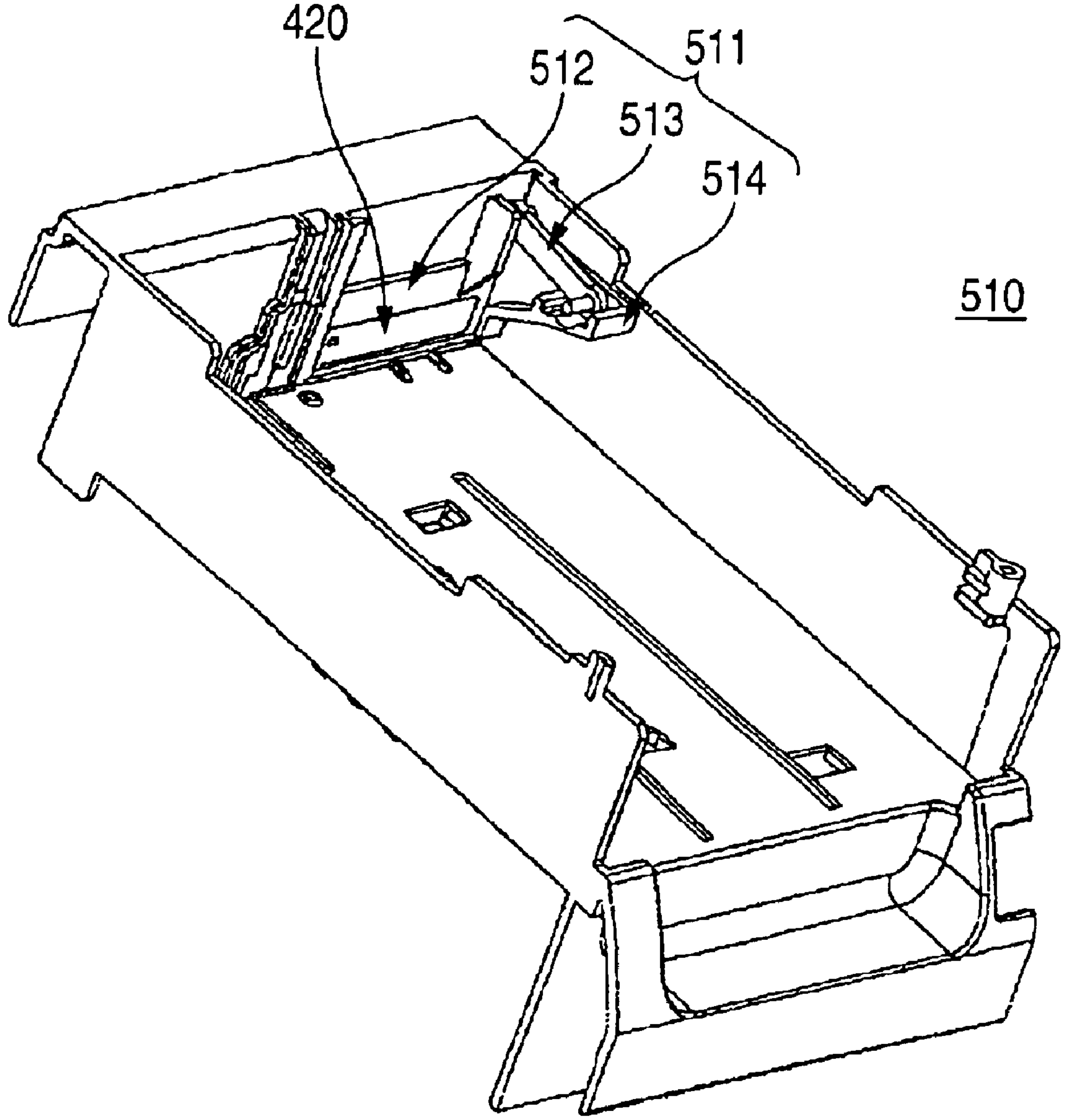
FIG. 24 is a perspective view showing an essential part of an ink jet recording apparatus according to a third embodiment of the invention.

FIG. 24 shows only one cartridge mounting part 510 in the ink cartridge holder of the ink jet recording apparatus according to the present embodiment. The window 320 of the cartridge mounting part 510 is provided with a shutter section 511 for opening and closing this window 320.

The shutter section 511 includes a shutter plate 512 movable in a vertical direction, a slider 514 which is to be abutted against the ink cartridge 200 and move horizontally when the ink cartridge 200 is inserted into the cartridge mounting part 510, and a shaft 513 which converts the movement of this slider 514 to a vertical movement thereby to vertically move the shutter plate 512.

Figure 25:
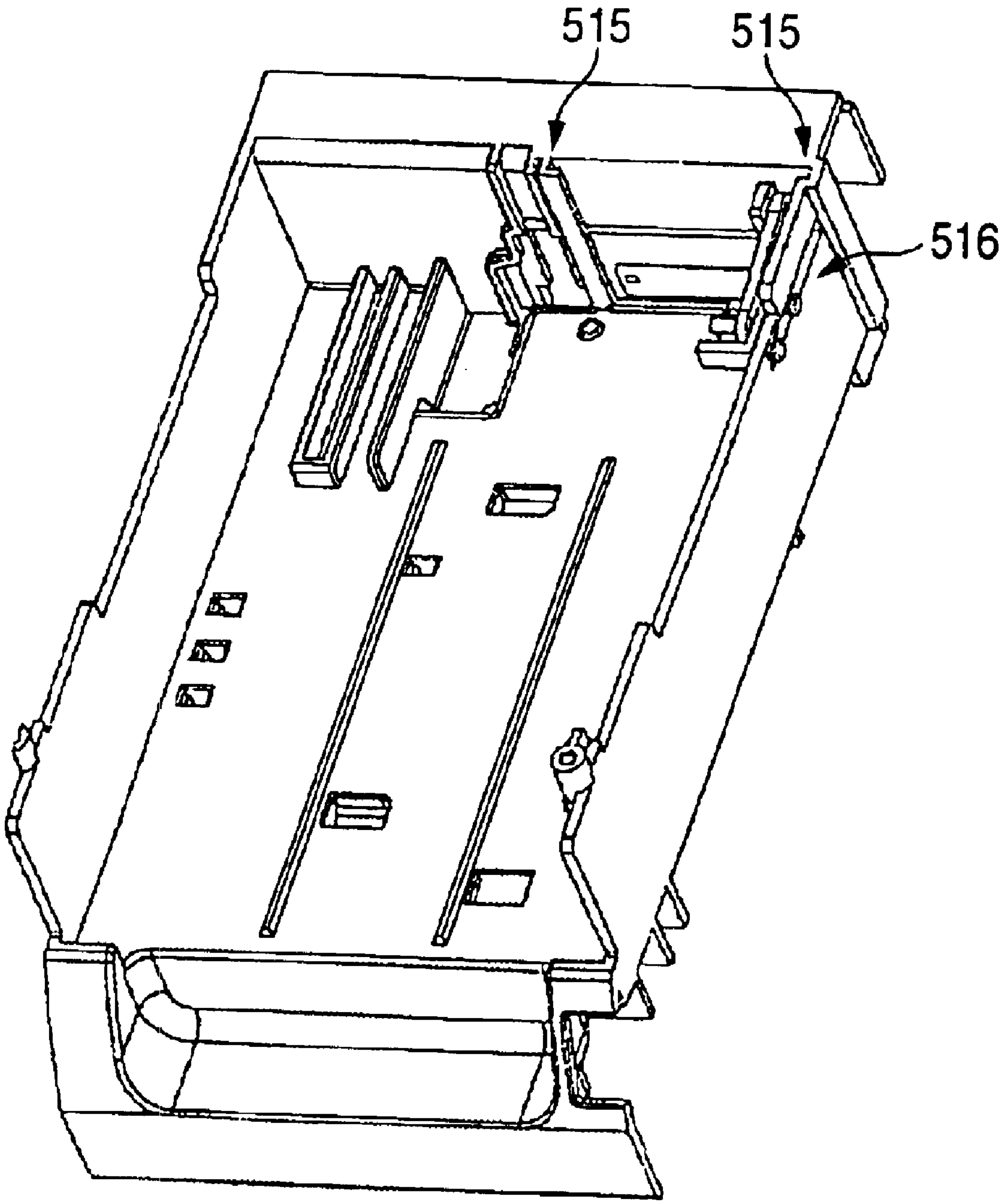
FIG. 25 is a perspective view of the essential part of the ink jet recording apparatus, as seen in a different angle from FIG. 24.

As shown in FIG. 25, there are further provided vertical guides 515 for regulating the movement of the shutter plate 512 in a vertical direction, and a horizontal guide 516 for regulating the movement of the slider 514 in a horizontal direction.

The shutter plate 512 carries a shutter IC label 420 inside thereof, as shown in FIG. 24. This shutter IC label 420 stores an information indicating "the ink cartridge is absent", and is adapted to communicate with the antenna board 410 of the carriage 130 in a non-contact manner.

Figure 26:
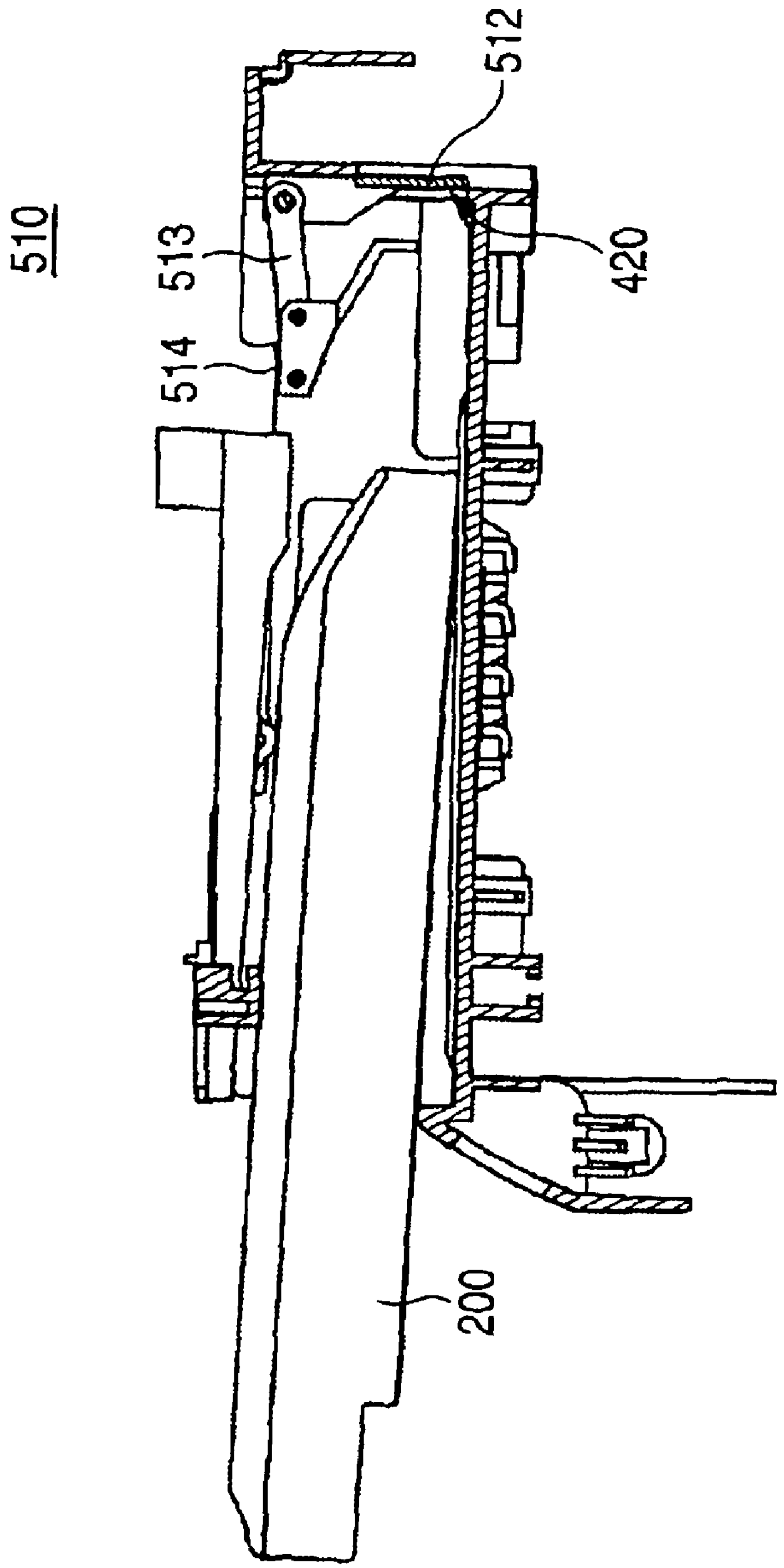
FIG. 26 is an explanatory view showing a state in which the ink cartridge has started to be inserted into a cartridge mounting part of FIG. 24.

Now, operation of the shutter section 511 will be described referring to FIGS. 26 through 29. To begin with, FIG. 26 shows a state where the ink cartridge 200 has started to be inserted into the cartridge mounting part 510. The shutter plate 512 is positioned at a lower side so as to close the window 320.

When the carriage 130 approaches on this occasion, the antenna board 410 of the carriage 130 comes near the shutter IC label 420 of the shutter plate 512, and communication between them is made possible.

Consequently, the antenna board 410 of the carriage 130 receives the information "the ink cartridge is absent" from the shutter IC label 420, and thus, the ink jet recording apparatus can accurately grasp exact situation of the relevant cartridge mounting part 510. Therefore, as compared with the case where the shutter is not provided, probability that the ink jet recording apparatus may obtain wrong information will be remarkably reduced.

Figure 27:
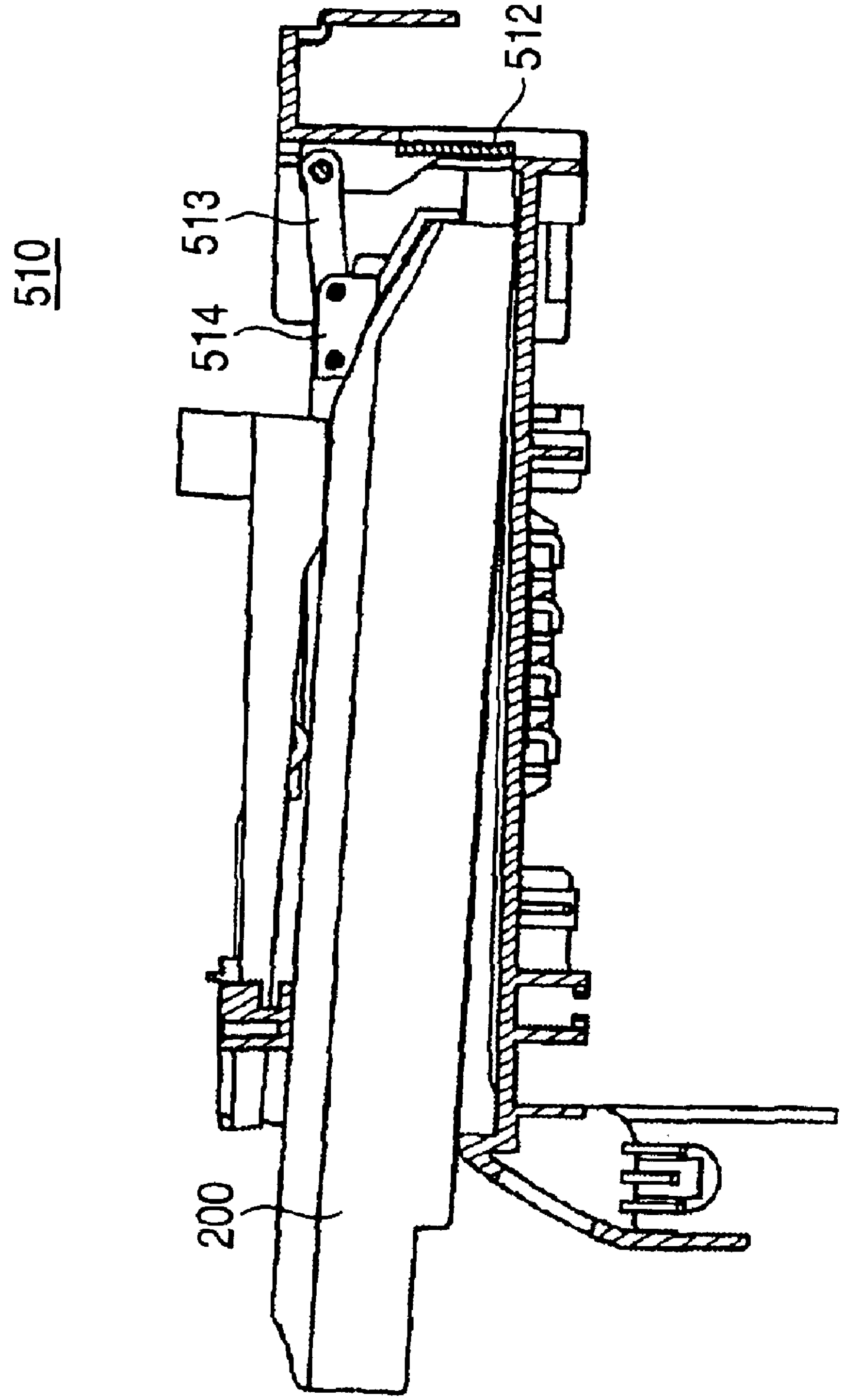
FIG. 27 is an explanatory view showing a state in which the ink cartridge of FIG. 26 has been further inserted and come into contact with a slider of FIG. 24.
Figure 28:
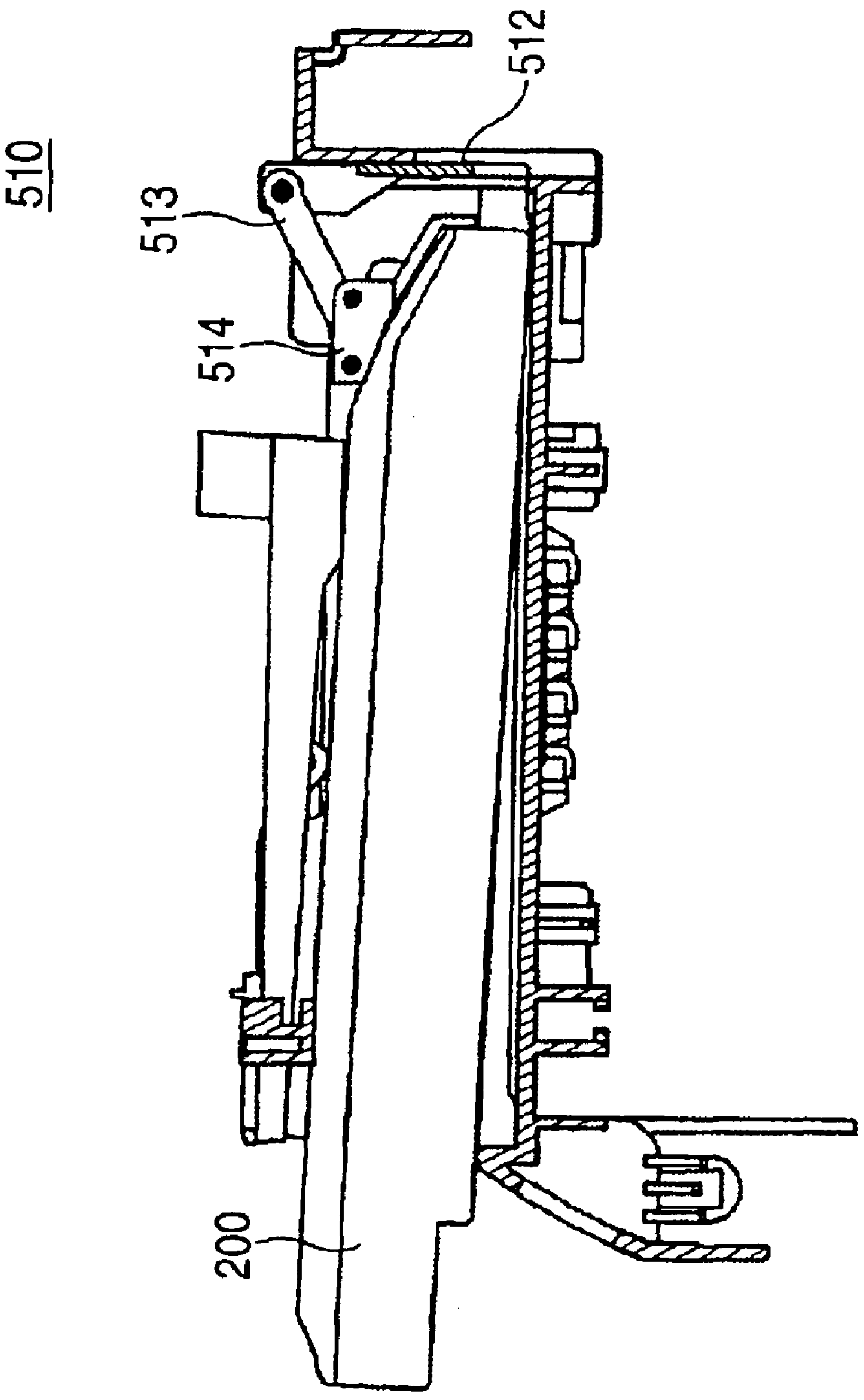
FIG. 28 is an explanatory view showing a state in which the ink cartridge of FIG. 26 has started to push in the slider of FIG. 24.

FIG. 27 shows the ink cartridge mounting part 510 in a state where the ink cartridge 200 has been further inserted and come into contact with the slider 514, and FIG. 28 shows the same in a state where the ink cartridge 200 has started to push in the slider 514. As shown in FIGS. 27 and 28, when the ink cartridge 200 has come into contact with the slider 514 and started to push it in a horizontal direction, the slider 514 also moves, thereby to put the shutter plate 512 in a half-opened state by way of the shaft 513.

Figure 29:
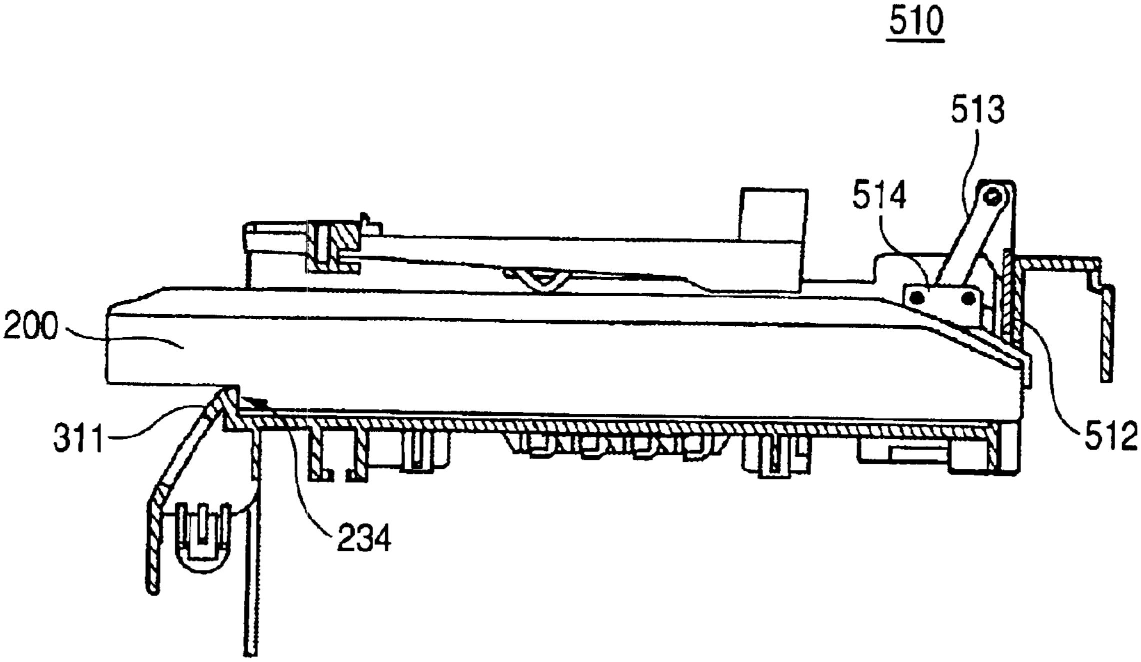
FIG. 29 is an explanatory view showing a state in which the ink cartridge of FIG. 26 has been further inserted and correctly arranged.

FIG. 29 shows the ink cartridge mounting part 510 in a state where the ink cartridge 200 has been further inserted and correctly positioned. The slider 514 has been further pushed, and the positioning recesses 234 of the ink cartridge 200 have been engaged with the supporting members 311 of the cartridge mounting part 510. Then, the shutter plate 512 has been completely moved to the upper position to open the window 320, and as the results, the protrusion 231 of the ink cartridge 200 has come to be opposed to this window 320.

Because the surrounding area of the window 320 is formed of sheet iron and has radio wave shielding function, in the same manner as in the second embodiment, when the radio waves carrying the prepredetermined information are generated from the antenna part of the IC label 400, the radio waves directly arrives at the antenna board 410 through the window 320. Those radio waves generated from the antenna part of the IC label 400 in a diagonal direction are blocked by the sheet iron surrounding the window 320 and hindered from arriving at the antenna board 410. Accordingly, the radio waves is transmitted from the antenna part of the IC label 400 to the antenna board 410 with high directivity, thus enabling the information to be accurately exchanged between the antenna part of the IC label 400 and the antenna board 410.

The shutter section 511 in this embodiment opens and closes the window 320 in association with the operation of the ink cartridge 200, when the ink cartridge 200 is mounted on the cartridge mounting part 510. Therefore, the shutter section 511 has a mechanism of excellent usability, with no need of requesting the user to take a particular action.

The present invention is not limited to the above described embodiments. In addition, the above described embodiments may be combined with each other.

What is claimed is:

1. A shielding device, comprising:

a first plate member, which constitutes a part of a main frame of a liquid ejection apparatus;

a second plate member, extended from the first plate member such that a first part thereof opposes to a traveling path of a carriage which carries a plurality of liquid containers each provided with an IC chip and a receiving antenna; and an antenna board, on which a transmission antenna is provided, the antenna board being mounted on the first part of the second plate member, wherein the second plate member is formed with a first region which allows the transmission antenna to establish radio communication with the receiving antenna, and a second region which shields radio waves.

2. The shielding device as set forth in claim 1, wherein:

the second plate member is comprised of iron; and the first region is provided as a cutout portion piercing through the second plate member.

3. The shielding device as set forth in claim 2, wherein:

the transmission antenna comprises a load fluctuation detector, operable to detect load fluctuation generated when the receiving antenna receives a radio signal transmitted from the transmission antenna, in order to read information stored in the IC chip; and the first region is formed so as to oppose to the load fluctuation detector.

4. The shielding device as set forth in claim 1, wherein the antenna board is provided as a flexible board member.

5. A liquid ejection apparatus, comprising the shielding member as set forth in claim 1 and a liquid ejection head operable to eject liquid supplied from the liquid containers.

6. A liquid ejection apparatus, comprising:

a liquid ejection head, operable to eject liquid therefrom;

a first communicator;

a carriage, which carries the liquid ejection head and the first communicator along a traveling path thereof;

at least one liquid supplier, which comprises:

- a pack member which contains therein liquid to be supplied to the liquid ejection head;
- a casing member which houses the pack member therein; and
- a second communicator, operable to communicate information regarding liquid contained in the pack member with the first communicator via radio communication; and a holder, in which the liquid supplier is mounted, the holder formed with at least one window which opposes to the second communicator in a case where the liquid supplier is mounted in the holder, and opposes to the traveling path of the carriage so that the first communicator and the second communicator establish the radio communication through the window in a case where the first communicator opposes to the window, wherein a first region around the window is so configured as to shield radio waves.

7. The liquid ejection apparatus as set forth in claim 6, wherein the first region is comprised of iron.

8. The liquid ejection apparatus as set forth in claim 6, wherein a plurality of liquid suppliers and a plurality of windows are arranged in the holder along the traveling path of the carriage, such that each of the windows is associated with one of the liquid suppliers.

9. The liquid ejection apparatus as set forth in claim 6, wherein:

the holder is provided with a shutter member operable to close the window in a case where the liquid supplier is not mounted in the holder; and the shutter member is provided with a third communicator operable to communicate information that no liquid supplier is mounted in the holder with the first communicator, in a case where the shutter closes the window.

10. The liquid ejection apparatus as set forth in claim 6, wherein:

a first positioning member is provided on a lower face of the casing member;

a second positioning member is provided on a mount face of the holder on which the lower face of the casing member is placed, such that the first positioning member is engaged with the second positioning member in a case where the liquid supplier is correctly mounted in the holder; and the holder is provided with a retainer which presses an upper face of the casing member toward the mount face of the holder, so that the liquids supplier is retained in the holder.

* * * * *